(12) United States Patent
Kuroiwa

(10) Patent No.: US 10,063,749 B2
(45) Date of Patent: Aug. 28, 2018

(54) COMPUTER PROGRAM PRODUCT FOR COLOR CALIBRATION AND CONTROL DEVICE WITH DATABASE ASSOCIATING WHITE-GROUND COLOR DIFFERENCE, TYPE OF PRINT MEDIUM, AND COLOR

(71) Applicant: Konica Minolta, Inc., Chiyoda-ku, Tokyo (JP)

(72) Inventor: Tomoko Kuroiwa, Hino (JP)

(73) Assignee: Konica Minolta, Inc., Chiyoda-ku, Tokyo (JP)

(*) Notice: Subject to any disclaimer, the term of this patent is extended or adjusted under 35 U.S.C. 154(b) by 1 day.

(21) Appl. No.: 15/463,110

(22) Filed: Mar. 20, 2017

(65) Prior Publication Data

US 2017/0280022 A1  Sep. 28, 2017

(30) Foreign Application Priority Data

Mar. 23, 2016  (JP) .................................. 2016-057906

(51) Int. Cl.
*H04N 1/00* (2006.01)
*H04N 1/60* (2006.01)
*G06K 15/02* (2006.01)

(52) U.S. Cl.
CPC ......... *H04N 1/6019* (2013.01); *G06K 15/027* (2013.01); *G06K 15/1878* (2013.01);
(Continued)

(58) Field of Classification Search
None
See application file for complete search history.

(56) References Cited

U.S. PATENT DOCUMENTS 6,351,320 B1 * 2/2002 Shin ...................... G06K 15/00
358/1.16
7,986,447 B2 * 7/2011 Bang ................... H04N 1/6097
345/600
(Continued)

FOREIGN PATENT DOCUMENTS

JP    2007-089031 A    4/2007
JP    2012-023627 A    2/2012

*Primary Examiner* — Scott A Rogers
(74) *Attorney, Agent, or Firm* — Buchanan Ingersoll & Rooney PC

(57) ABSTRACT

Provided are a non-transitory computer-readable storage medium storing a control program for creating a database for use in color calibration and that storing a control program for a judgement based on the database. The control programs cause a computing device to perform the following operations. The database-creating operations include calculating a white-ground color difference using a print medium, and repeating a feedback adjustment of a color correction LUT, to obtain a resulting color accuracy. The operations further include obtaining white-ground color differences and resulting color accuracies for plural paper products of a certain print medium type, to obtain a mathematical relation and create a database. The judgement operations include using the database to calculate an estimated resulting color accuracy from a white-ground color difference calculated using a print medium, and judging whether to perform a feedback adjustment of a color correction LUT based on the estimated resulting color accuracy.

27 Claims, 21 Drawing Sheets

(52) U.S. Cl.
CPC ..... *H04N 1/00015* (2013.01); *H04N 1/00023* (2013.01); *H04N 1/00034* (2013.01); *H04N 1/00045* (2013.01); *H04N 1/00068* (2013.01); *H04N 1/00082* (2013.01); *H04N 1/00092* (2013.01); *H04N 1/6008* (2013.01); *H04N 1/6027* (2013.01); *H04N 1/6033* (2013.01); *H04N 1/6097* (2013.01); *H04N 2201/0094* (2013.01)

(56) References Cited

U.S. PATENT DOCUMENTS

| | | | |
|---|---|---|---|
| 8,125,694 B2* | 2/2012 | Matsuzawa | H04N 1/6033 358/406 |
| 2007/0070371 A1 | 3/2007 | Miyazaki | |
| 2012/0013923 A1 | 1/2012 | Sakurai | |
| 2014/0063515 A1* | 3/2014 | Sugita | G06K 15/1878 358/1.9 |
| 2014/0293300 A1* | 10/2014 | Teraue | H04N 1/6036 358/1.9 |
| 2016/0241745 A1* | 8/2016 | Ohba | H04N 1/6033 |
| 2016/0309060 A1* | 10/2016 | Fukuda | H04N 1/6025 |

* cited by examiner

FIG. 2

| | L*a*b* VALUES OF WHITE COLOR OR GROUND COLOR | WHITE-GROUND COLOR DIFFERENCE |
|---|---|---|
| COLOR CALIBRATION TARGET FOR PAPER TYPE A | (94, 1.9, -9.6) | 0 |
| PAPER TYPE A, PAPER PRODUCT 1 | (93, 0.11, 0.52) | 8.7 |
| PAPER TYPE A, PAPER PRODUCT 2 | (93, 1.4, -8.1) | 1.9 |
| COLOR CALIBRATION TARGET FOR PAPER TYPE B | (93, 0.82, -0.95) | 0 |
| PAPER TYPE B, PAPER PRODUCT 3 | (94, 0.02, -1.5) | 1.6 |
| PAPER TYPE B, PAPER PRODUCT 4 | (93, 0.94, -0.67) | 0.3 |
| ... | ... | ... |

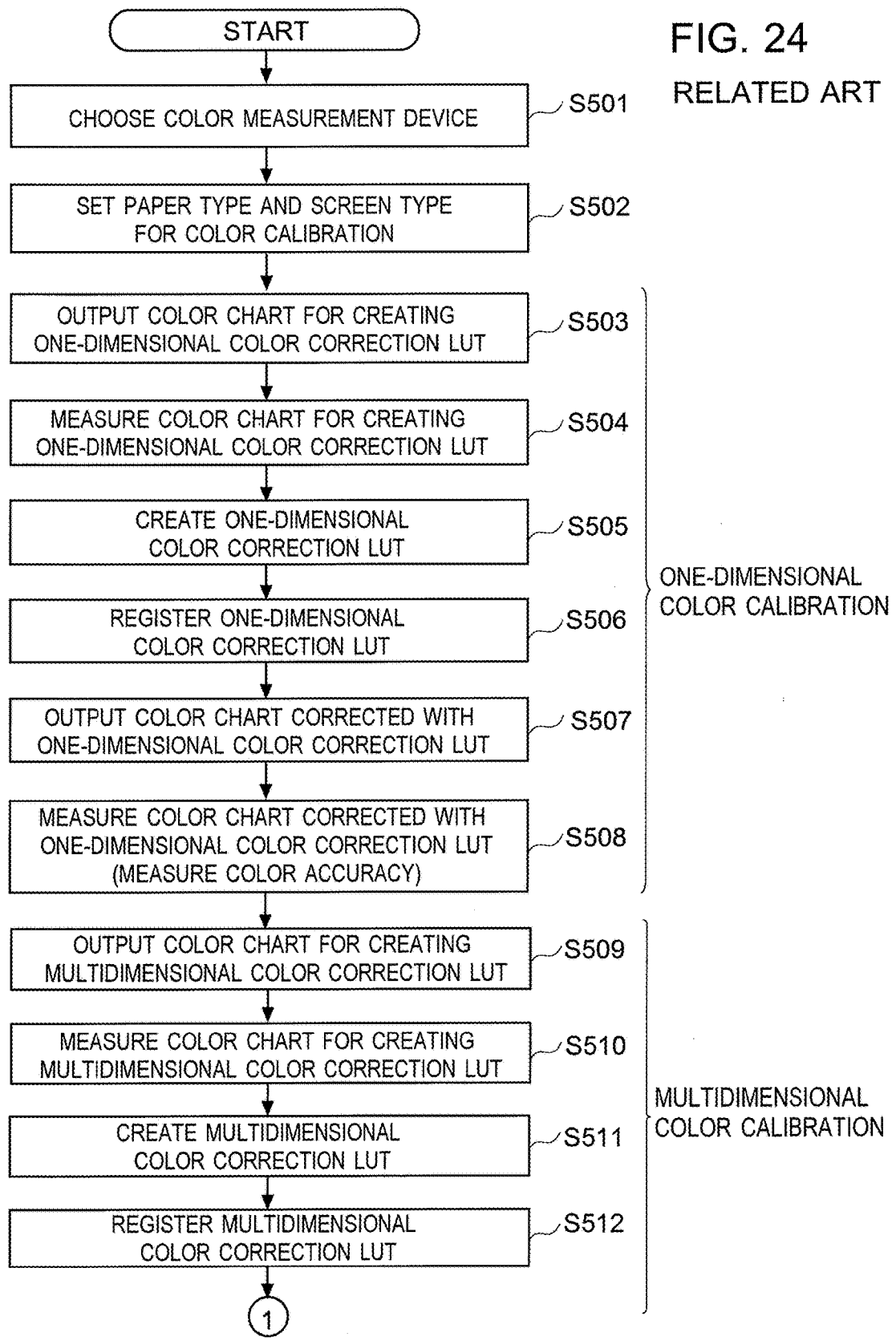

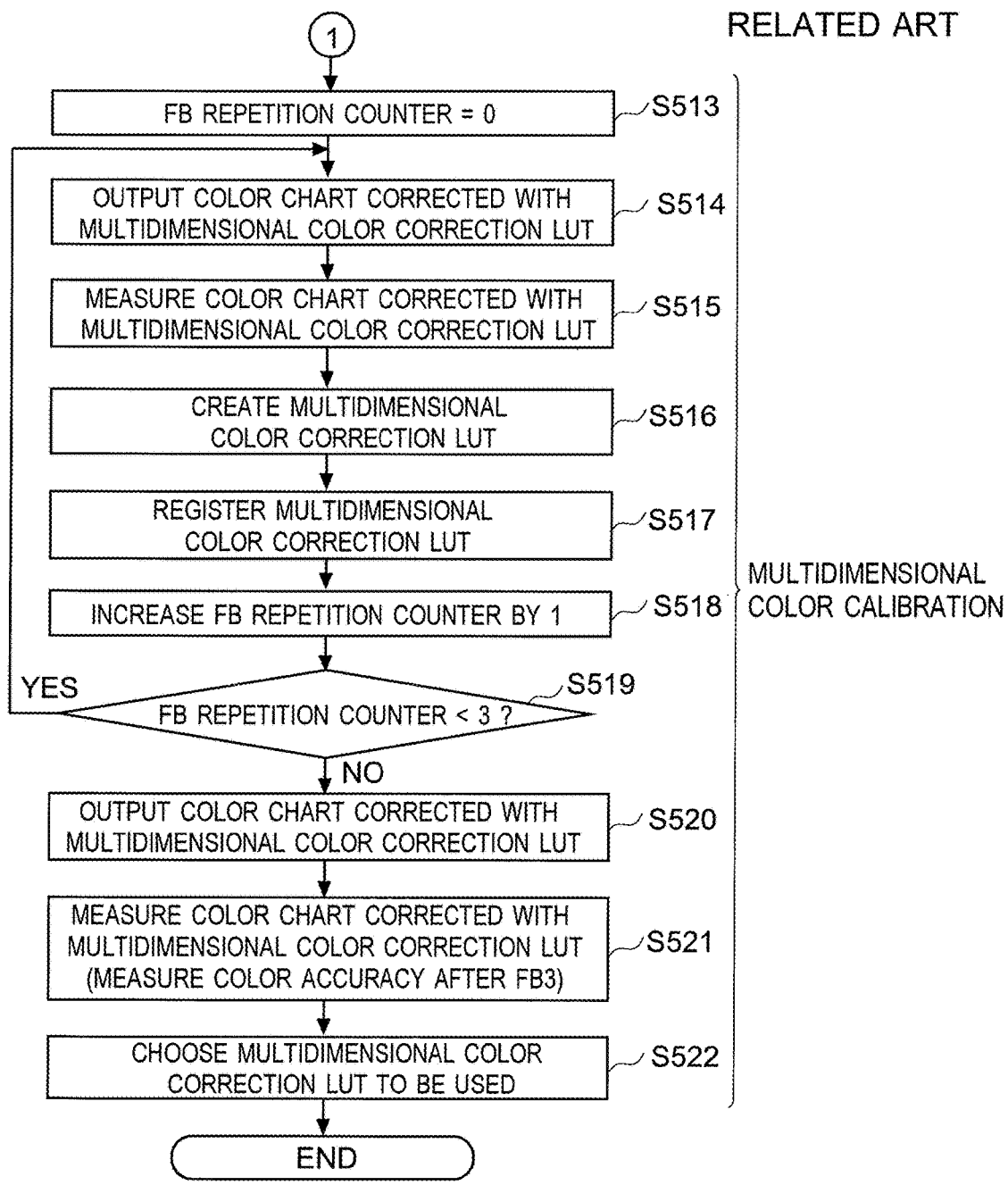

COMPUTER PROGRAM PRODUCT FOR COLOR CALIBRATION AND CONTROL DEVICE WITH DATABASE ASSOCIATING WHITE-GROUND COLOR DIFFERENCE, TYPE OF PRINT MEDIUM, AND COLOR

The entire disclosure of Japanese Patent Application No. 2016-057906 filed on Mar. 23, 2016 including description, claims, drawings, and abstract are incorporated herein by reference in its entirety.

TECHNICAL FIELD

The present invention is directed to non-transitory computer-readable storage media each storing a control program for color calibration, and control devices. In particular, the present invention is directed to a non-transitory computer-readable storage medium storing a control program that causes a computing device or processor to create a database to be used for a judgement whether to execute a feedback loop in color calibration, a non-transitory computer-readable storage medium storing a control program that causes a computing device or processor to perform feedback control in the color calibration on the basis of the database, a control device configured to create the database, and a control device configured to perform the feedback control in the color calibration on the basis of the database.

BACKGROUND

For printing devices like electrophotographic printers, color calibration, which is adjustment of colors output from a printing device, is important to maintain constant print quality. As a method of keeping the print quality, there is known a method of using a tone reproduction curve or a one-dimensional LUT (look-up table) prepared for each of the primary colors of C (cyan), M (magenta), Y (yellow) and K (black) to carry out a tone adjustment for each primary color. Such color calibration using one-dimensional LUTs can be performed with a reduced calculation load and can be processed in short time, but hardly handles a change in color balance of the primary colors. From the point of view of maintaining constant color balance of the primary colors, various types of color calibration using a multidimensional LUT like a three-dimensional or a four-dimensional LUT have been proposed, for example, in JP-A No. 2007-089031 which corresponds to US2007/0070371A1.

In general, a printing device is calibrated mostly by using one-dimensional LUTs in order to solve a fluctuation of color reproducibility which can be made in the course of several days in normal operation, and is calibrated mostly by using a multidimensional LUT at the initial adjustment in the manufacturing process of the printing device or at a time when the operation environment of the printing device has been changed significantly, for example, at a use of different material lot or at a change of season. The color calibration using a multidimensional LUT includes a process of a feedback (abbreviated to FB) adjustment to improve the color accuracy of the color calibration, by printing a color chart corrected with a color correction LUT, measuring color of the color chart printed, and updating the color correction LUT, as disclosed in, for example, JP-A No. 2012-023627 which corresponds to US2012/0013923A1.

The technology disclosed in JP-A No. 2012-023627 employs a feedback adjustment of a device-link profile by using relative white color. In concrete terms, in the technology, the mean of actual measurement errors (color differences) between two kinds of color values is calculated. First is color values which are in a device-independent color space and indicate colors of color reproduction characteristics of a target device, corrected on the basis of paper white. Second is color values which are in a device-independent color space and are obtained by color measurement of an output of a color image given with a printer. If the mean of the actual measurement errors has the value of three or more, creation of a device-link profile is repeated. On the other hand, if the value of the mean is less than three, creation of a device-link profile is ended.

In other words, the technology disclosed in JP-A No. 2012-023627 removes paper white, which is unadjustable, from colors, and performs color evaluation. On the other hand, in well-known printing standards, including Japan Color, FOGRA and IDEAlliance, color evaluation is performed on the basis of the absolute white color. Those standards support different color values of paper white and a different color gamut from each other. Therefore, the method of the feedback adjustment of a device-link profile disclosed in JP-A No. 2012-023627 can hardly judge whether to perform the feedback adjustment properly according to paper type.

SUMMARY

The present invention is directed to non-transitory computer-readable storage media each storing a control program for color calibration, and control devices.

A non-transitory computer-readable storage medium reflecting one aspect of the present invention stores a control program for color calibration. The control program comprises instructions which, when executed by a computing device or processor, cause the computing device or processor to perform the following operations. The computing device or processor is configured to control a printing unit and a color measurement unit and communicably connected with a storage unit. The operations comprise: (1) creating an image of a color calibration chart including an array of patches of colors in a color calibration target and using the printing unit to print the image of the color calibration chart on a print medium as one of a plurality of paper products belonging to a predetermined type of print medium. The operations further comprise: (2) obtaining data of color measurement of the color calibration chart printed on the print medium in (1) from the color measurement unit; and (3) calculating a white-ground color difference being a color difference between color values of white color in the color calibration target and measured color values of a ground of the print medium. The operations further comprise: (4) creating a color correction LUT which makes measured color values of each patch color of the color calibration chart, obtained by the color measurement in (2) close to color values of a corresponding color in the color calibration target. The operations further comprise: (5) adjusting the color correction LUT by repeating a feedback adjustment of the color correction LUT a predetermined number of times. The feedback adjustment includes (A) creating an image of a corrected color calibration chart including an array of patches of colors in the color calibration target corrected with the color correction LUT, and using the printing unit to print the image of the corrected color calibration chart on a print medium as the one of the plurality of paper products belonging to the predetermined type of print medium. The feedback adjustment further includes (B) obtaining data of color measurement of the corrected color calibration chart printed on the print medium in (A) from the color measurement unit. The feedback adjustment further includes (C) calculating color differences between measured color values of patch colors of the corrected color calibration chart, obtained by the color measurement in (B) and color values of respective colors in the color calibration target, and obtaining a representative color difference of the color differences. The feedback adjustment further includes (D) creating a color correction LUT which makes measured color values of each patch color of the corrected color calibration chart, obtained by the color measurement in (B) close to color values of a corresponding color in the color calibration target. The operations further comprise: (6) choosing a smallest value among the representative color differences obtained by a predetermined number of repetitions of the feedback adjustment in (5), as a resulting color accuracy for the one of the plurality of paper products. The operations further comprise: (7) performing (1) to (6) on at least one print medium as another or others of the plurality of paper products belonging the predetermined type of print medium, to create a database to be used for a judgement of a necessity for a feedback adjustment of a color correction LUT, for the predetermined type of print medium. The creating the database includes associating, with the predetermined type of print medium, the white-ground color difference and the resulting color accuracy both obtained for each paper product belonging to the predetermined type of print medium, to obtain a mathematical relation which gives from a certain white-ground color difference a corresponding resulting color accuracy, creating the database on a basis of the mathematical relation, and storing the database into the storage unit.

A non-transitory computer-readable storage medium reflecting another aspect of the present invention stores another control program for color calibration. The control program comprises instructions which, when executed by a computing device or processor, cause the computing device or processor to perform operations. The computing device or processor is configured to control a printing unit, a color measurement unit and an output unit and communicably connected with a storage unit. The operations comprise: (i) creating an image of a color calibration chart including an array of patches of colors in a color calibration target and using the printing unit to print the image of the color calibration chart on a print medium as one of a plurality of paper products belonging to a predetermined type of print medium. The operations further comprise: (ii) obtaining data of color measurement of the color calibration chart printed on the print medium in (i) from the color measurement unit; and (iii) creating a color correction LUT which makes measured color values of each patch color of the color calibration chart, obtained by the color measurement in (ii) close to color values of a corresponding color in the color calibration target. The operations further comprise: (iv) adjusting the color correction LUT by performing a feedback adjustment of the color correction LUT. The feedback adjustment includes (a) creating an image of a corrected color calibration chart including an array of patches of colors in the color calibration target corrected with the color correction LUT, and using the printing unit to print the image of the corrected color calibration chart on a print medium as the one of the plurality of paper products belonging to the predetermined type of print medium. The feedback adjustment further includes (b) obtaining data of color measurement of the corrected color calibration chart printed on the print medium in (a) from the color measurement unit, and (c) calculating color differences between measured color values of patch colors of the corrected color calibration chart, obtained by the color measurement in (b) and color values of respective colors in the color calibration target, and obtaining a representative color difference of the color differences. The feedback adjustment further includes (d) calculating a white-ground color difference being a color difference between color values of white color in the color calibration target and measured color values of a ground of the print medium. The feedback adjustment further includes (e) using a database stored in the storage unit, including data which associates the white-ground color difference and the resulting color difference for each of paper products belonging to the predetermined type of print medium, and obtaining an estimate of a resulting color accuracy corresponding to the white-ground color difference calculated in (d). The feedback adjustment further includes (f) making a judgement of a necessity for a feedback adjustment of the color correction LUT by comparing the representative color difference calculated in (c) with the estimate of the resulting color accuracy obtained in (e), using the output unit to output a result of the judgement, and receiving an operator's instruction whether or not to perform a succeeding feedback adjustment of the color correction LUT.

A control device reflecting another aspect of the present invention is a control device connected with a printing unit and a color measurement unit. The control device comprises: a storage unit; and a processor that performs operations according to the instructions of the former control program.

A control device reflecting another aspect of the present invention is a control device connected with a printing unit and a color measurement unit. The control device comprises: a storage unit; an output unit; and a processor that performs operations according to the instructions of the latter control program.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein:

FIG. 2 is a table of white-ground color differences each indicating a color difference between color values of white color in a color calibration target prepared for each printer model and each paper type and measured color values of the ground color of a print medium to be used for color calibration;

FIG. 24 and FIG. 25 are flowcharts illustrating an example of a procedure of conventional color calibration;

Each of FIGS. 26A and 26B illustrates an example of color charts for color calibration.

DESCRIPTION OF THE PREFERRED EMBODIMENTS

Figure 1:
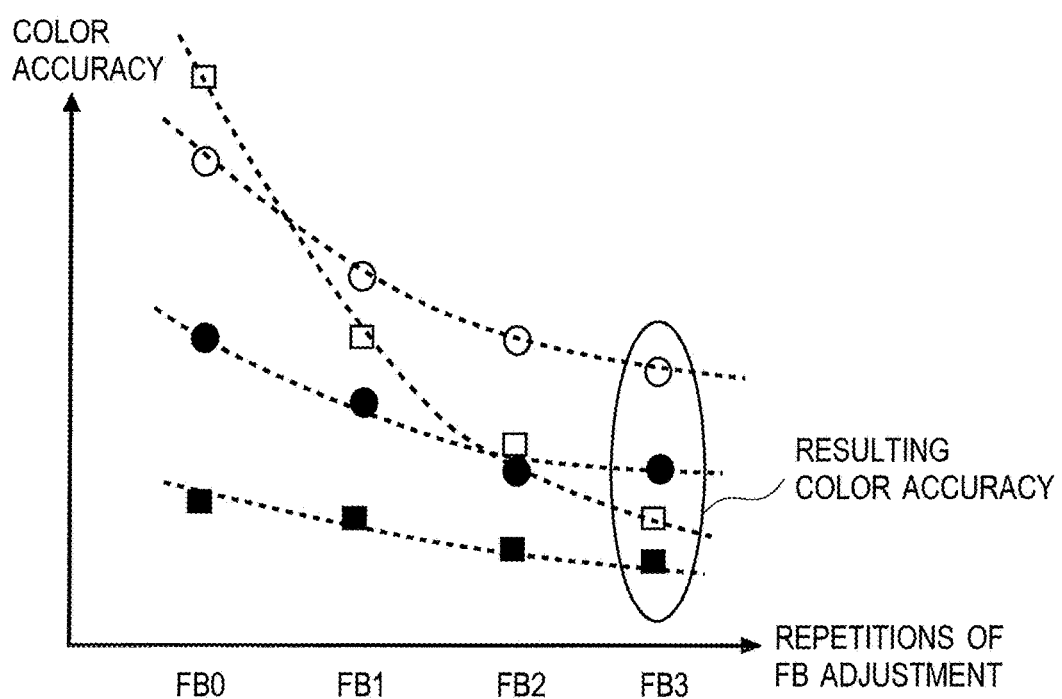
FIG. 1 is a diagram illustrating a relationship between the number of repetitions of a feedback adjustment and the color accuracy.

Hereinafter, embodiments of the present invention will be described with reference to the drawings. However, the scope of the invention is not limited to the illustrated examples.

Non-transitory computer-readable storage media each storing a program for color calibration and control devices as embodiments of the present invention allow, in color calibration using a color correction LUT, a proper judgement whether or not to perform a feedback adjustment of the color correction LUT according to types of print medium or paper products.

That is because a computing device or processor configured to control a printing unit and a color measurement unit, (when executing a control program) creates a database to be used for a judgement of a necessity for a feedback adjustment of a color correction LUT and stores the database into a storage unit, by performing the following operations. That is, the computing device or processor (when executing the control program) uses the printing unit to output a color calibration chart on a print medium to be used for color calibration, and obtains data of color measurement of the color calibration chart from the color measurement unit, where the print medium is one of a plurality of paper products belonging to a predetermined type of print medium. The computing device or processor then calculates a white-ground color difference between color values of white color in a color calibration target and measured color values of a ground of the print medium. The computing device or processor then creates a color correction LUT which makes measured color values of each patch color of the color calibration chart close to color values of a corresponding color in the color calibration target (or which reduces a deviation of the measured color values of the color calibration chart from color values of corresponding colors in the color calibration target). The computing device or processor then adjusts the color correction LUT by repeating a feedback adjustment of the color correction LUT the predetermined number of times. The feedback adjustment includes using the color calibration chart corrected with the color correction LUT to create a color correction LUT, and obtaining a representative color difference by calculating color differences between measured color values of patch colors of the corrected color calibration chart and color values of respective colors in the color calibration target. The computing device or processor then chooses the smallest value among the representative color differences obtained by the repetitions of the feedback adjustment, as a resulting color accuracy for the one of the paper products. The computing device or processor performs the above-described operations on print media as other paper products belonging the predetermined type of print medium, to associate the white-ground color difference and the resulting color accuracy both obtained for each paper product together with the predetermined type of print medium and obtain a mathematical relation which gives, from a certain white-ground color difference, a corresponding resulting color accuracy. The computing device or processor creates a database to be used for a judgement whether to perform a feedback adjustment of a color correction LUT, on the basis of the mathematical relation, and stores the database into a storage unit.

That is also because another computing device or processor configured to control a printing unit, a color measurement unit and an output unit, (when executing a control program) makes a judgement of a necessity for a feedback adjustment of a color correction LUT to inform an operator about a result of the judgement, by performing the following operations. That is, the computing device or processor (when executing the control program) uses the printing unit to output a color calibration chart, which was corrected by a color correction LUT, on a print medium, and obtains data of color measurement of the corrected color calibration chart, from the color measurement unit. The computing device or processor then calculates a representative color difference and a white-ground color difference on the basis of the obtained data, where the representative color difference is obtained on the basis of color differences between measured color values of patch colors of the corrected color calibration chart and color values of respective colors in the color calibration target, and the white-ground color difference is a color difference between color values of white color in the color calibration target and measured color values of a ground of the print medium. The computing device or processor then uses the database prepared in advance, to obtain an estimate of a resulting color accuracy corresponding to the white-ground color difference calculated from the ground color of the print medium. The computing device or processor makes a judgement whether to perform a feedback adjustment of the color correction LUT by comparing the representative color difference with the estimate of the resulting color accuracy, and informs an operator about a result of the judgement.

Those allow, in color calibration, a proper judgement whether or not to perform a feedback adjustment of a color correction LUT according to print medium type or paper product, and avoid a drawback that a succeeding feedback adjustment is performed even when a succeeding feedback adjustment is not estimated to improve the color accuracy of the color calibration or the feedback adjustment is ended even when a succeeding feedback adjustment is estimated to improve the color accuracy of the color calibration, before an occurrence of the drawback.

As described in BACKGROUND, printing devices like electrophotographic printers are calibrated by using one-dimensional LUTs in order to maintain the print quality, and are calibrated by using a multidimensional LUT, like a three-dimensional or four-dimensional LUT, in order to maintain the color balance of primary colors. The color calibration using a multidimensional LUT includes a feedback adjustment of the multidimensional LUT to improve the color accuracy of color calibration, where the feedback adjustment includes processes of printing a color chart corrected with the multidimensional LUT, measuring color of the color chart printed, and updating the multidimensional LUT.

A description is given of an outline of a procedure of conventional color calibration using one-dimensional LUTs and a multidimensional LUT, with reference to a flowchart which shows a series of processes to be executed for conventional color calibration. The flowchart is separately illustrated in FIG. 24 and FIG. 25 on account of space considerations.

First, as illustrated in FIG. 24, an operator chooses a color measurement device to be used for color measurement of a color chart (S501), and sets a paper type and a screen type for use in the color calibration (S502).

Figure 26A:
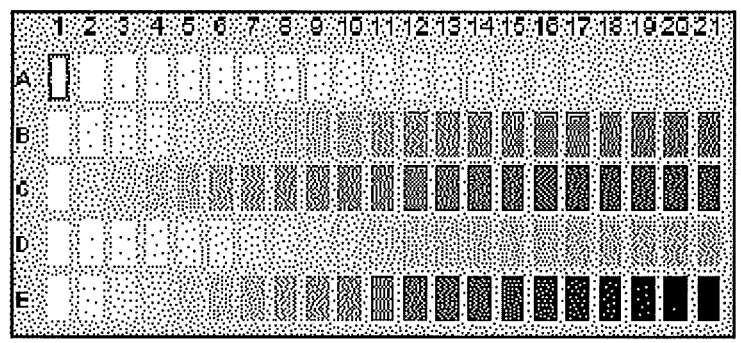

Next, one-dimensional color calibration is performed on a printing device. In concrete terms, a color chart for creating one-dimensional color correction LUTs, which are used for one-dimensional color calibration, is output with the printing device (S503). FIG. 26A illustrates an example of a color chart for creating one-dimensional color correction LUTs, and the color chart includes arrays of color patches prepared by gradually changing tone values for each of CMYK colors being the primary colors. Next, the color chart is measured with the color measurement device chosen in S501 (S504), one-dimensional color correction LUTs are created on the basis of the color measurement (S505), and the color correction LUTs created are registered (S506). Then, the color chart corrected with the registered one-dimensional color correction LUTs is output with the printing device (S507), and the color chart is measured to obtain the color accuracy of the color calibration is measured (S508).

Figure 26B:
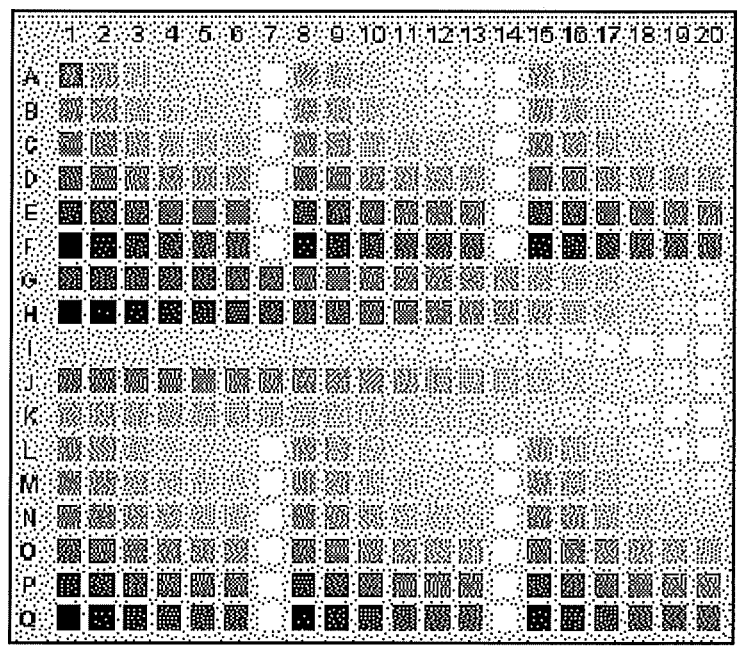

Subsequently, as illustrated in FIG. 24 and FIG. 25, multidimensional color calibration is performed on the printing device. In concrete terms, a color chart for creating a multidimensional color correction LUT, which is used for multidimensional color calibration, is output with the printing device (S509). FIG. 26B illustrates an example of a color chart for creating a multidimensional color correction LUT, and the color chart includes an array of patches of colors as combinations of various tone values of CMY colors being the primary colors. Next, the color chart is measured with the color measurement device chosen in S501 (S510), a multidimensional color correction LUT is created on the basis of the color measurement (S511), and the color correction LUT created is registered (S512).

Next, the counter of repetitions of a feedback adjustment is set to zero (S513) to start the feedback adjustment of the multidimensional color correction LUT. The color chart corrected with the multidimensional color correction LUT created in S511 is output with the printing device (S514), and the corrected color chart is measured (S515). The measurement result is used for obtaining the color accuracy of the color calibration and for creating a multidimensional color correction LUT. Then, a multidimensional color correction LUT is created based on the measurement result (S516) and is registered (S517). Next, the counter of repetitions of a feedback adjustment is increased by 1 (S518), and a judgement whether the number of repetitions of the feedback adjustment is less than a predetermined number (for example, three) is made (S519). When the number of repetitions of the feedback adjustment is less than three, the procedure goes back to S514 and repeats the same processes.

On the other hand, when the number of repetitions of the feedback adjustment is not less than three, the color chart corrected with the multidimensional color correction LUT is output with the printing device (S520), and the color chart is measured to obtain the color accuracy of the color calibration given after the feedback adjustment was repeated three times (S521). Then, a multidimensional color correction LUT to be used is chosen (S522), and a series of the processes of color calibration ends.

Figure 27:
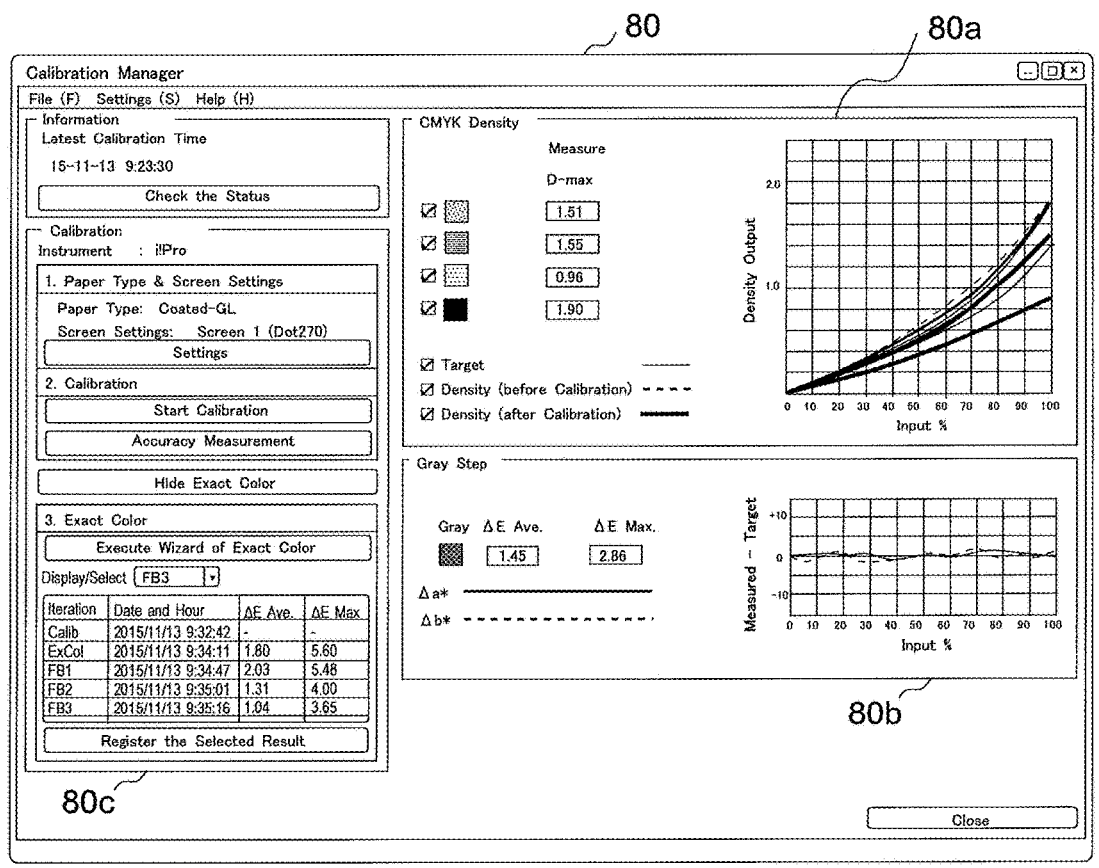
FIG. 27 is a diagram of an example of a color-calibration screen.

FIG. 27 illustrates an example of color-calibration screen 80 for use in the above-described color calibration. The color-calibration screen 80 shows, in the upper right part 80a, results of the color correction using one-dimensional color correction LUTs for CMYK colors being the primary colors. The color-calibration screen 80 further shows, in the lower right part 80b, a result of a gray-balance correction using a multidimensional color correction LUT. Gray colors in this part are colors each composed of the C, M and Y colors and excluding the K color. In general, gray colors composed of only the K color can be reproduced as stable colors, but gray colors composed of the C, M and Y colors can be reproduced unstably, and sometimes can be reproduced as chromatic colors. The Human's eye has a property of, when a gray color that should be reproduced as an achromatic color ($a^*=b^*=$zero) has actuary been reproduced as a chromatic color, perceiving such the color standing out from other colors and being attracted to the color. Herein, $a^*$ and $b^*$ are the chromaticity coordinates in the $L^*a^*b^*$ color system and the $a^*$ and $b^*$ indicate color directions: $+a^*$ is the red direction, $-a^*$ is the green direction, $+b^*$ is the yellow direction, and $-b^*$ is the blue direction. In the $L^*a^*b^*$ color system, $L^*$ indicates lightness.

The graph in the upper right part 80a is given on the basis of measurement of color patches prepared by gradually changing the tone value of each of the CMYK colors separately. As for cyan, the graph shows output density values (on the vertical axis) against input percentages of the cyan. The density values are given by preparing input colors and by printing and measuring patches of these colors. The input colors are each composed of the cyan of a gradually changing percentage and the other colors of zero percentages, for example, plural sets of CMYK percentages: (0, 0, 0, 0), (10, 0, 0, 0), (20, 0, 0, 0), . . . , (90, 0, 0, 0), and (100, 0, 0, 0). The graph also shows output density values of other colors: magenta, yellow and black in the same manner.

The graph in the lower right part 80b is given on the basis of measurement of color patches prepared by gradually changing the tone values of the CMY colors (without changing the tone value of the K color) so as to make the CMY colors have the same tone values. The graph shows color differences Δa* (on the vertical axis) against input percentages. The color differences Δa* are given by preparing input colors and by printing and measuring patches of these colors, and calculating the color differences Δa* between the measured color values "a*measure" and corresponding color values "a*target" in the multidimensional color-calibration target. The input colors are, for example, plural sets of CMYK percentages: (0, 0, 0, 0), (10, 10, 10, 0), (20, 20, 20, 0), . . . , (90, 90, 90, 0), (100, 100, 100, 0). The graph also shows color differences Δb* in the same manner.

The multidimensional color-calibration target uses colors represented by a*=b*=0 as target colors. In the graph in the lower right part 80b, the greater Δa* or Δb* value indicates a color farther from achromatic colors. Color calibration using a multidimensional color correction LUT needs more complicated processes for color matching in comparison with color calibration using one-dimensional color correction LUTs. Therefore, in the color calibration, as shown in the above-described flowcharts, the process of feedback adjustment, which includes outputting and measuring a color chart corrected with a multidimensional color correction LUT and recreating a multidimensional color correction LUT, is repeatedly performed to improve the color accuracy of the color calibration (please see the lower left part 80c in FIG. 27).

In other words, conventional color calibration is performed according to the following processes, where the steps (1) to (4) are for one-dimensional color calibration and the steps (5) to (9) are for multidimensional color calibration:

(1) outputting and measuring a color chart for creating one-dimensional color correction LUTs, (2) creating one-dimensional color correction LUTs, (3) outputting and measuring the color chart corrected with the one-dimensional color correction LUTs, (4) measuring the color accuracy of one-dimensional color calibration, (5) outputting and measuring a color chart for creating a multidimensional color correction LUT, (6) creating a multidimensional color correction LUT, (7) outputting and measuring the color chart corrected with the multidimensional color correction LUT, (8) repeating (6) and (7) the predetermined number of times (for example, three times), and (9) measuring the color accuracy after a predetermined number of repetitions of the feedback adjustment.

In the market, there are many types of print medium or paper types (for example, uncoated plain paper, uncoated color paper, uncoated fine paper, gloss-coated paper, matte-coated paper and dull-coated paper) and there are various paper products (which have different characteristics) belonging to each of the types. Examples of paper products include woodfree printing paper, thin printing paper and special printing paper which are classified as (belong to) the type of uncoated fine paper. Since paper products are different in white color of the ground and in amount of toner to be adhered to paper, the resulting color accuracy of color calibration, which is a color accuracy given as a result of repetitions of a feedback adjustment in color calibration, is different according to paper product. Therefore, in conventional color calibration disclosed in JP-A 2012-023627, it was difficult to judge whether to perform a feedback adjustment of a color correction LUT in color calibration, on the basis of a uniform threshold value for various paper products, and it was difficult to judge sufficient time to stop the repetition of the feedback adjustment. In the conventional color calibration, a judgement of a necessity of the feedback adjustment was made after output and measurement of a color chart were repeated several times. For example, the color accuracy was measured after repetitions of the feedback adjustment, and the succeeding feedback adjustment was canceled or stopped if the measured color accuracy was less improved in comparison with that of the last feedback adjustment.

In the meantime, in color calibration such that a printer is calibrated by using the same paper product as that specified in a printer profile for a standard printing device being a target device, the first-time color adjustment, in most cases, results in that output colors almost match the target colors and the succeeding feedback improves colors as not great as that was given by the first-time adjustment. Therefore, when installing a printing device which supports the same paper product as that specified in a device profile for the standard printing device, the feedback adjustment can be regarded as unnecessary so as to reduce the time and efforts of a service man or woman who installs the printing device.

From such a background, there is a demand for a proposal of a method of making a proper judgement whether to perform a feedback adjustment of a color correction LUT in color calibration. The inventor studied how the resulting color accuracy of color calibration changes according to the number of repetitions of the feedback adjustment, for each paper type and each paper product.

FIG. 1 illustrates the relationship between the number of repetitions of the feedback adjustment and the color accuracy. In the graph of FIG. 1, symbols of circles and squares represent experimental values of the color accuracies obtained after a predetermined number of repetitions of the feedback adjustment, for certain paper types (paper types A and B) and certain paper products (paper products 1 to 4), and dotted lines represent approximation curves calculated from the experimental values. As can be seen from FIG. 1, the degree of improvement of the color accuracy given by each repetition of the feedback adjustment, depends on paper types and paper products. Not only the degree of improvement of the color accuracy, but also the resulting color accuracy, which is a color accuracy given as a result of repetitions of the feedback adjustment, depends on paper types and paper products. In the graph of FIG. 1, as values of the color accuracy on the vertical axis, the means of color differences of all color patches (referred to the mean color difference of all color patches) in a color chart are calculated as follows. First, there is prepared a color chart including patches of various combinations of CMYK colors, where the color patches include patches of three-color grays (grays given by mixing 0% K and same percentages of CMY colors). Next, color differences between measured color values obtained by printing and measuring the color chart and color values of corresponding colors in a gray-balanced color calibration target are calculated for all the patches in the color chart, and the mean of these color differences is calculated. When the mean color difference of all color patches, has the value closer to zero, it indicates that print output is closer to the gray-balanced color calibration target.

The graph of FIG. 1 shows the color accuracies according to the number of repetitions of the feedback adjustment, for the certain paper types and the certain paper products. Even if the same paper type and paper product is used, the degree of change of the color accuracy according to the number of repetitions of the feedback adjustment, depends on printer models, individual printers and screen types. FIG. 2 shows a table of color values of white color in a color calibration target, color values of the ground color of print material, and white-ground color differences, given for a certain printer model and certain paper types (paper types A and B). In the table of FIG. 2, "L*a*b* values of white color or ground color" indicates color values of white color in a gray-balanced color calibration target prepared for each printer model and each paper type, and color values of the ground color of a print medium to be used for color calibration, by using L*a*b* values. The color values of white color in the color calibration target are color values of a patch (referred to as a white patch) of color indicated by zero percentages of CMYK colors, which are represented as (C, M, Y, K)=(0, 0, 0, 0), in the color calibration target. The color values of the ground color of a print medium are measured color values obtained by color measurement of the ground (a part corresponding to the white patch) of paper as a paper product to be used for the color calibration. The white-ground color difference in the table is a color difference between the color values of white color in a gray-balanced color calibration target prepared for a certain printer model and a certain paper type, and the measured color values of the ground color of a print medium.

Figure 3:
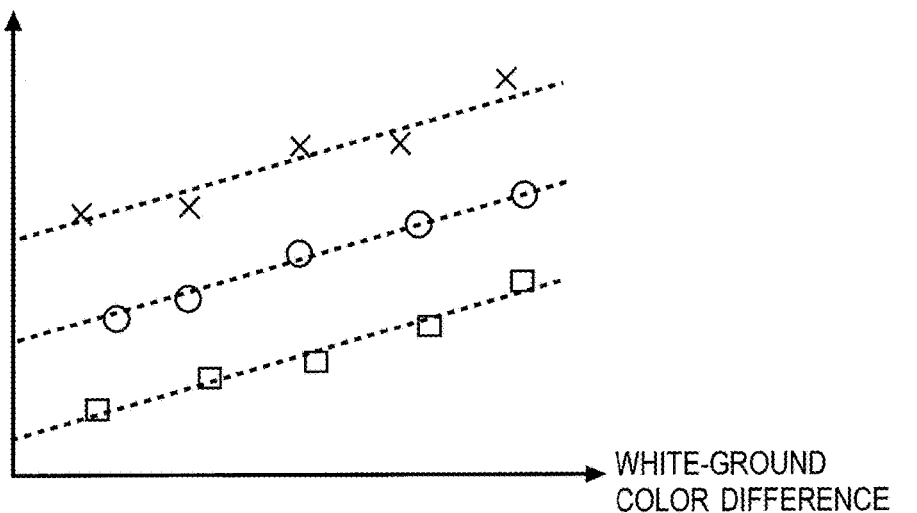
FIG. 3 is a diagram illustrating a relationship of white-ground color differences and resulting color accuracies for each printer model and each print medium type, according to one embodiment of the present invention.

FIG. 3 shows a graph by plotting the white-ground color differences in the table of FIG. 2 on the x-axis and the resulting color accuracies shown in FIG. 1 on the y-axis. In the graph of FIG. 3, symbols of crosses, circles and squares represent experimental values of the resulting color accuracies shown in FIG. 1 obtained for certain paper types (paper types A to C), a certain printer model (model I) and a certain individual printer (printer 1), and dotted lines represent approximation curves calculated from the experimental values. The inventor has found that the white-ground color differences and the resulting color accuracies show the relationship of a linear function which rises from left to right, for each paper type, each printer model, each individual printer and each screen type, as can be seen from FIG. 3. In other words, the inventor has newly found that the resulting color accuracies can be represented by values given by the following expression (1). That is, the resulting color accuracy is obtained by multiplying the white-ground color difference by a factor indicating the slope or gradient defined for each paper type, and adding the resulting value with a predetermined value (referred to as a rise value) relating to the each paper type. In this expression, the factor of the slope or gradient is defined for each paper type, but the factor may be defined for each printer model, each individual printer or each screen type in place of or additionally to paper type. Similarly, the rise value may be defined for each printer model, each individual printer or each screen type in place of or additionally to paper type.

$$\text{Resulting color accuracy} = \text{White-ground color difference} \times \text{Slope} + \text{Rise value} \quad (1)$$

In view of that, as embodiments of the present invention, there are provided non-transitory computer-readable storage media each storing a control program for color calibration including instructions which, when being executed, cause a computing device or processor to perform the following operations; control devices configured to perform the following operations; and control methods for use in color calibration performed in a printing system including a printing unit, a color measurement unit and a control device. As a first embodiment, a mathematical relation between white-ground color differences and resulting color accuracies (a mathematical relation as a criterion for a judgement of a feedback-adjustment necessity) is obtained experimentally, for example, at a stage of development of a printer model, and a database (hereinafter, referred to as a DB) is created to hold information of the obtained mathematical relation and is stored in a storage unit of a control device in a printing system (or a storage device which can be accessed by a computing device for making a judgement of a feedback-adjustment necessity). As a second embodiment, on performing multidimensional color calibration (gray-balance calibration or color matching for creating a device-link profile) by using a color correction LUT, a computing device or processor in a printing system obtains a representative color difference (for example, the above-described mean of color differences of all the color patches in a color chart) on the basis of measured color values of a color calibration chart corrected with a color correction LUT and color values of corresponding colors in a color calibration target. The computing device or processor refers to the database and further obtains an estimate of a resulting color accuracy of the color calibration, corresponding to a print medium to be used for the color calibration. The computing device or processor then compares the estimate of the resulting color accuracy with the representative color difference, and judges a necessity of a feedback adjustment of a color correction LUT on the basis of a result of the judgement. For example, the computing device or processor may make the judgement by calculating a white-ground color difference for the print medium as a print product to be used for color calibration and plotting the calculated white-ground color difference and the representative color difference on the graph of FIG. 3, where the white-ground color difference is a color difference between color values of white color in the color calibration target and measured color values of a ground (a part corresponding to the white patch) of the print medium as a print product to be used for color calibration. If the point of the white-ground color difference and representative color difference is located in the area above the approximation line (or located sufficiently far from the approximation line) in the graph of FIG. 3, the computing device or processor may judge that the color accuracy of the color calibration is expected to be improved after a feedback adjustment of a color correction LUT for use in the color calibration and then recommend a succeeding feedback adjustment to an operator. On the other hand, if the point of the white-ground color difference and representative color difference is located in the area below the approximation line (or located sufficiently close to the approximation line) in the graph of FIG. 3, the computing device or processor may judge that the color accuracy is not expected to be improved even after a succeeding feedback adjustment of the color correction LUT and then recommend not to perform a succeeding feedback adjustment to an operator.

The above-described gray-balance calibration is on the basis of color conversion which uses, as a target, a gray-balanced printer profile for a standard device (standard printing device), and on printing, a gray-balance correction LUT is applied to print data to perform the color conversion. In the technology disclosed in JP-A No. 2012-023627, in creation of a device-link profile to be used for color conversion, the device-link profile is adjusted by execution of a feedback adjustment, so as to improve the color accuracy. The above-described methods as the embodiments of the present invention can be used also for the disclosed technology.

Next, as a comparative example, a method of obtaining a resulting color accuracy of gray-balance calibration, on the basis of the color gamut of a printer is considered. With this method, in-gamut colors can be adjusted to target colors after repetitions of a feedback adjustment of a color correction LUT, but out-of-gamut colors cannot be represented by a printer even after repetitions of the feedback adjustment. Therefore, it is considered to use resulting color accuracies obtained for plural points on the outermost edge of the color gamut, for the calibration. First, from a printer profile for a gray-balance calibration target, color values indicating plural points on the outermost edge of the color gamut are obtained. Next, a color chart including colors which are represented by CMYK values and form the same outermost edge is prepared, and the color chart is printed with a printer and is measured to obtain color values indicating points on the outermost edge of the current color gamut of the printer. Then, color differences between the color values indicating the points on the outermost edge of the color gamut of the gray-balance calibration target and measured color values indicating the corresponding points on the outermost edge of the current color gamut of the printer, to obtain the resulting color accuracy for the points on the outermost edge of the color gamut. Thereby, the resulting color accuracy of the gray-balance calibration can be obtained.

Compared with the above-described method, the method as one embodiment of the present invention includes a process of fitting a mathematical relation (for example, a linear equation) to the relationship between white-ground color differences, which are color differences between white color in the color calibration target and the ground color of a print medium, and resulting color accuracy; and obtaining an estimate of a resulting color accuracy for the print medium on the basis of the mathematical relation. Therefore, the calculation of the method of one embodiment of the present invention is easier than that to obtain the resulting color accuracy from a color gamut in the above-described comparative example. Further, in the method of one embodiment of the present invention, the mathematical relation between the white-ground color differences and resulting color accuracies, is obtained for a predetermined type of print medium including plural print products. It allows a judgement of a necessity for a feedback adjustment of a color correction LUT in color calibration, in consideration of an actual color accuracy which depends on types of print medium and print products.

EXAMPLES

Example 1

Figure 7:
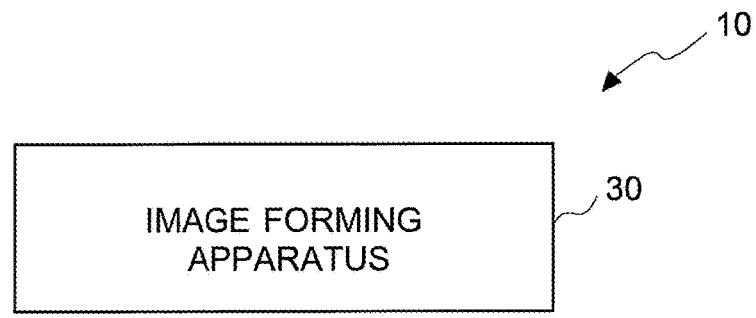
FIG. 7 is a block diagram of another example of the structure of a printing system according to Example 1.
Figure 8A:
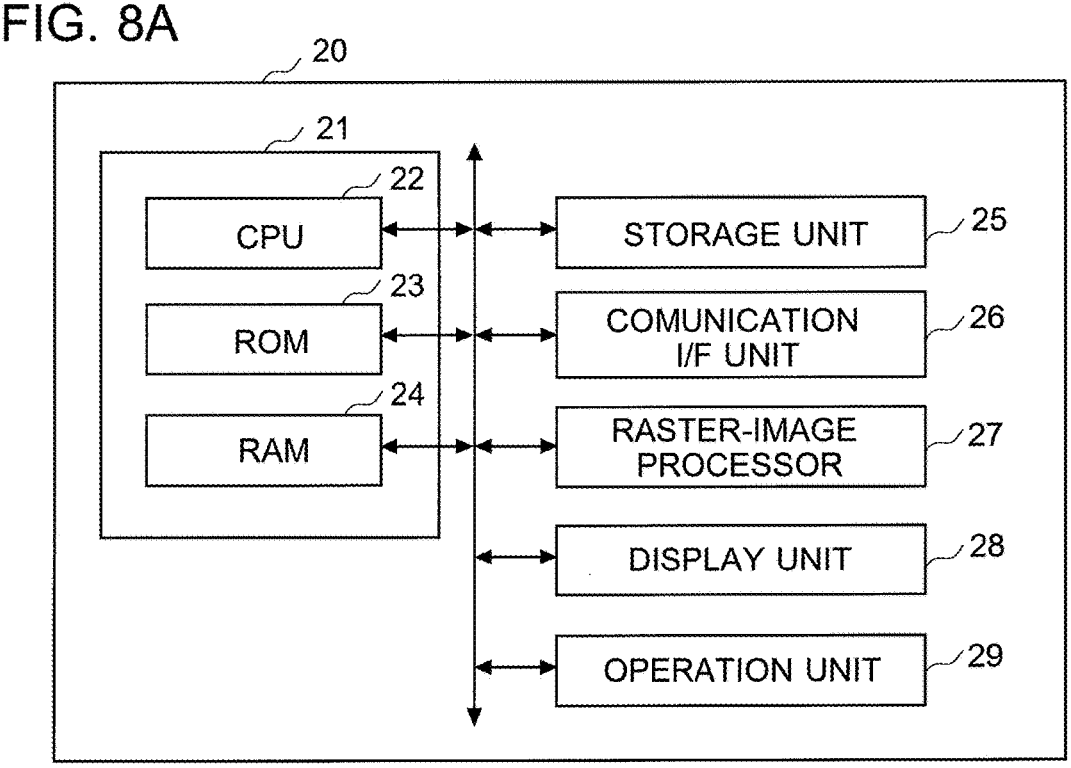
FIGS. 8A and 8B are block diagrams of an example of the structure of a controller in the printing system of FIG. 4, according to Example 1.
Figure 8B:
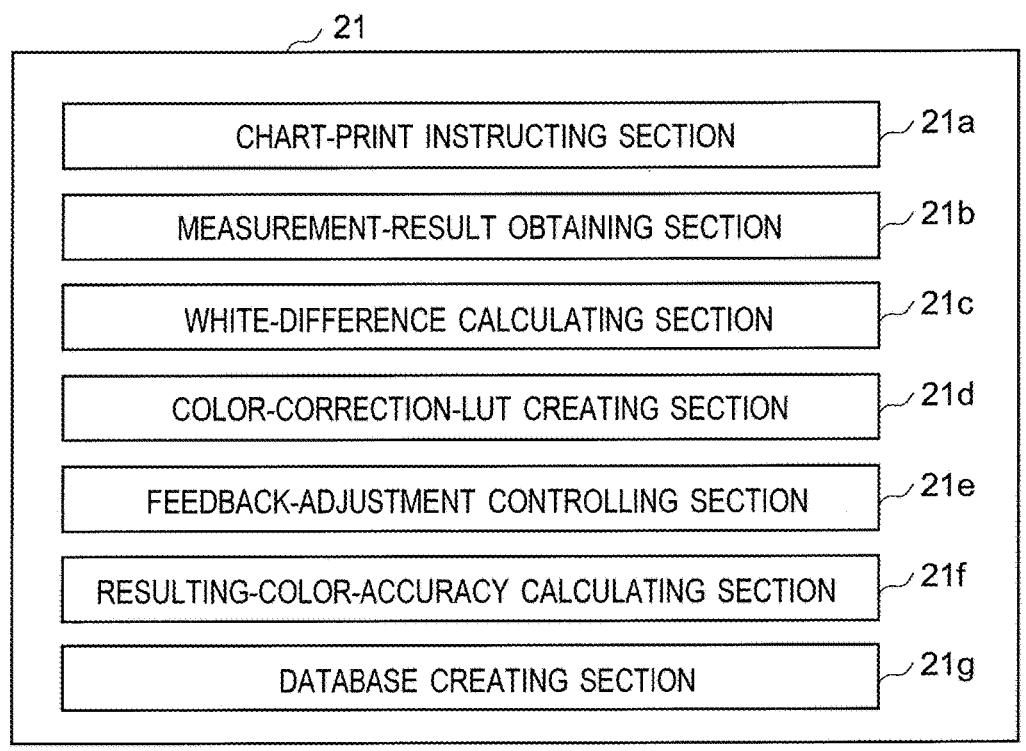
Figure 9:
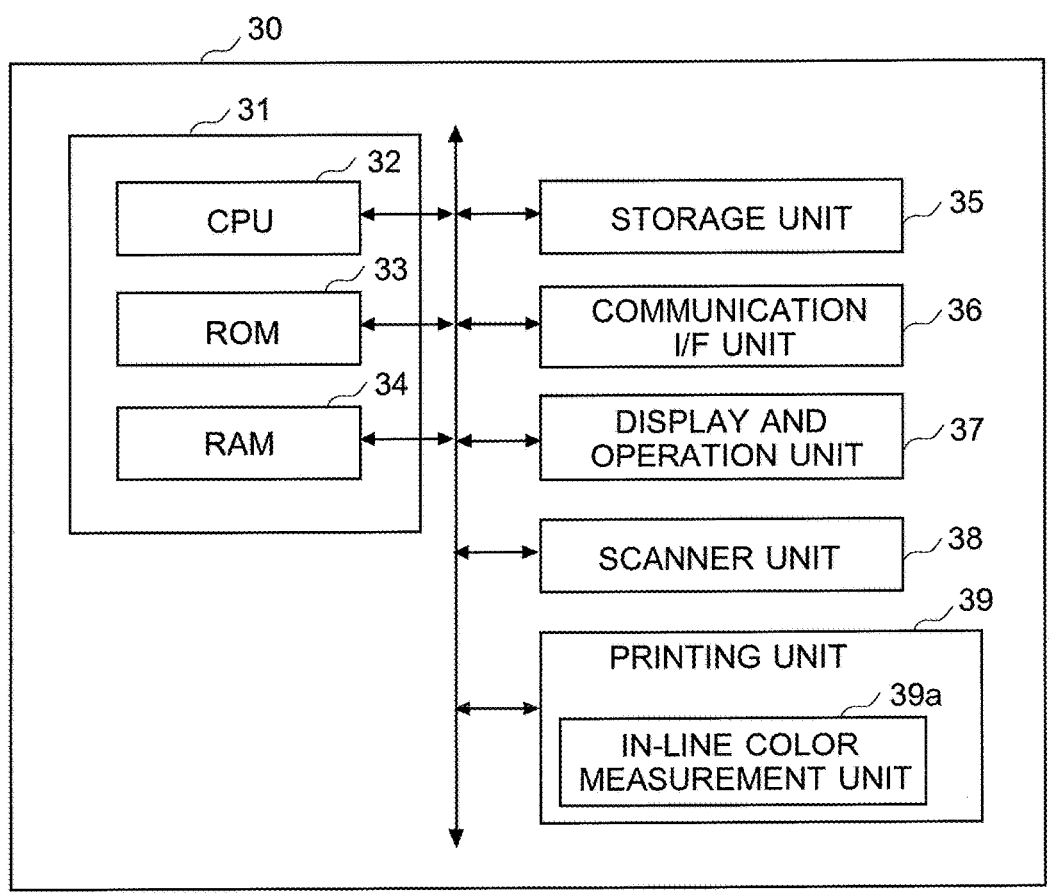
FIG. 9 is a block diagram illustrating an example of the structure of an image forming apparatus of FIG. 4, according to Example 1.
Figure 10:
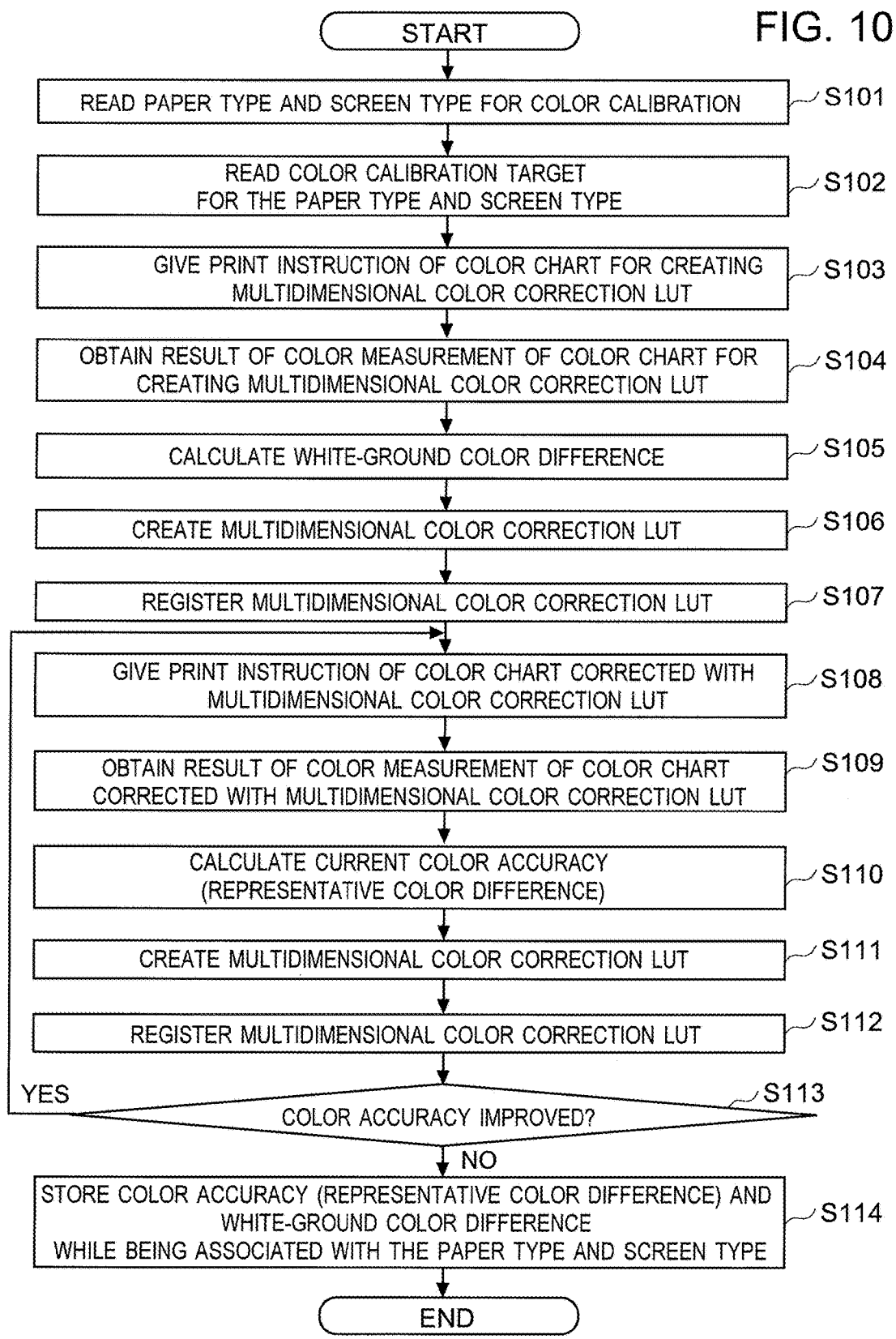
FIG. 10 is a flowchart illustrating an example of operations (creation of data for establishing a database) of the controller according to Example 1.
Figure 11:
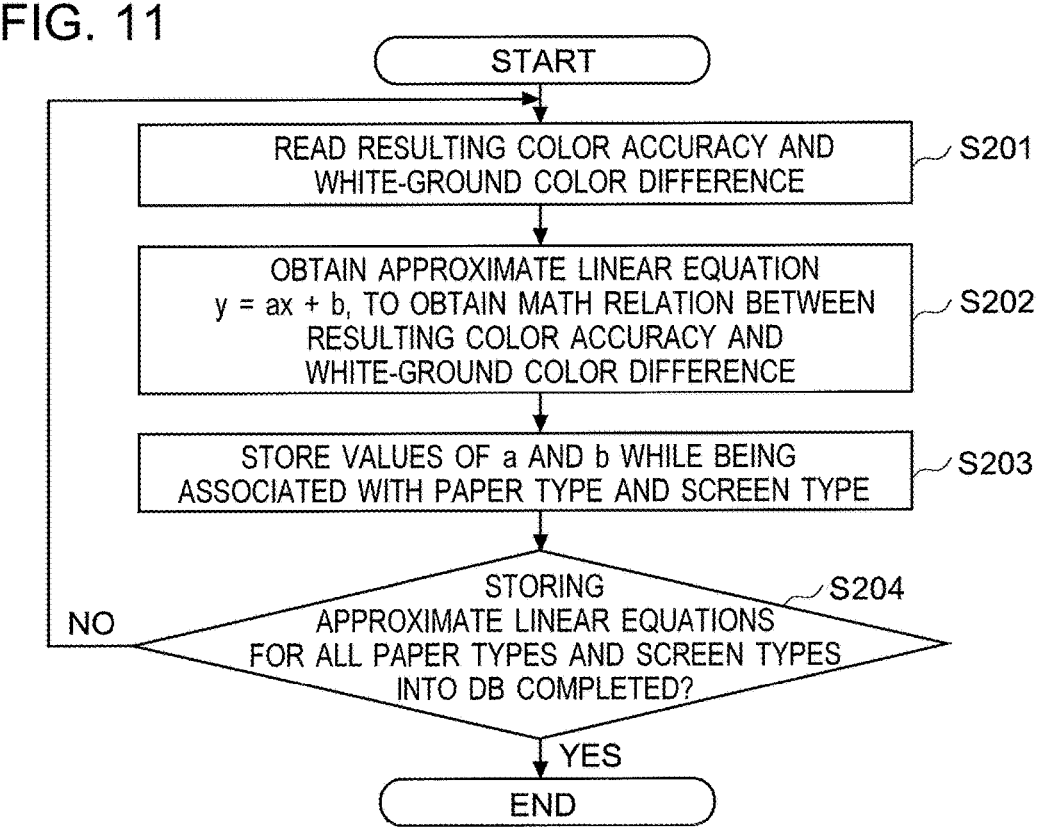
FIG. 11 is a flowchart illustrating an example of operations (establishing the database) of the controller according to Example 1.
Figure 12:
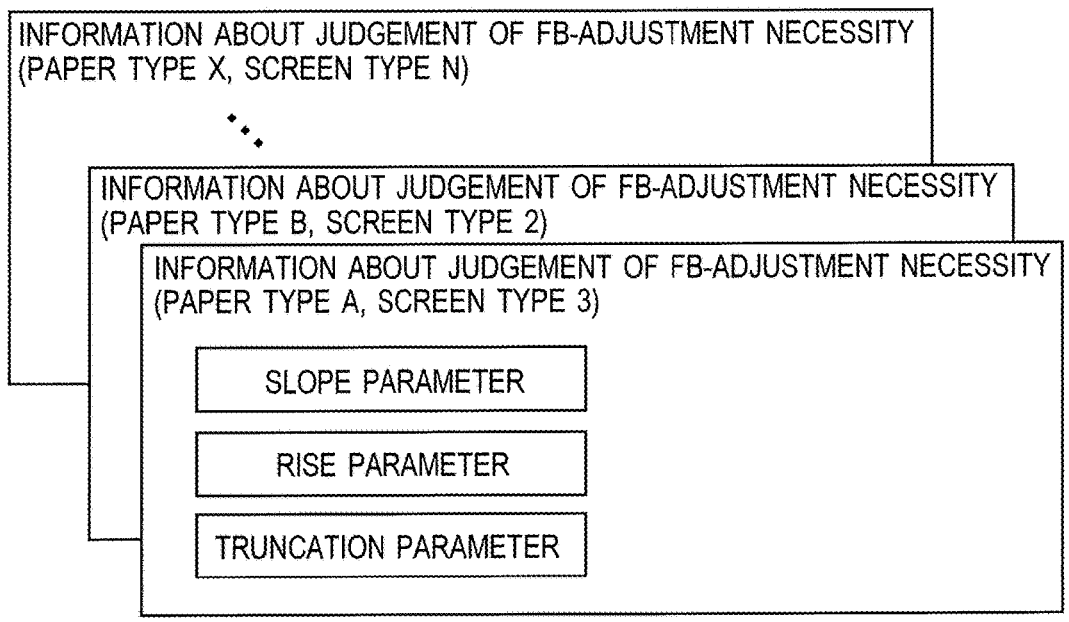
FIG. 12 is a diagram of an example of the structure of database according to Example 1.

In order to describe the above-mentioned embodiments of the present invention in more detail, a description is given to a non-transitory computer-readable storage medium storing a control program for color calibration, control devices and control methods according to Example 1, with reference to FIG. 4 to FIG. 12. Each of FIGS. 4 to 7 is a block diagram illustrating an example of the structure of a printing system according to Example 1. FIGS. 8A and 8B are block diagrams of an example of the structure of a controller in the printing system illustrated in FIG. 4. FIG. 9 is a block diagram illustrating an example of the structure of the image forming apparatus illustrated in FIG. 4. Each of FIG. 10 and FIG. 11 is a flowchart illustrating an example of operations of the controller. FIG. 12 is a diagram illustrating an example of the structure of a database according to Example 1. This example gives a description of a method of creating a database for use in a judgement whether or not to perform a feedback adjustment of a color correction LUT to be used for color calibration.

Figure 4:
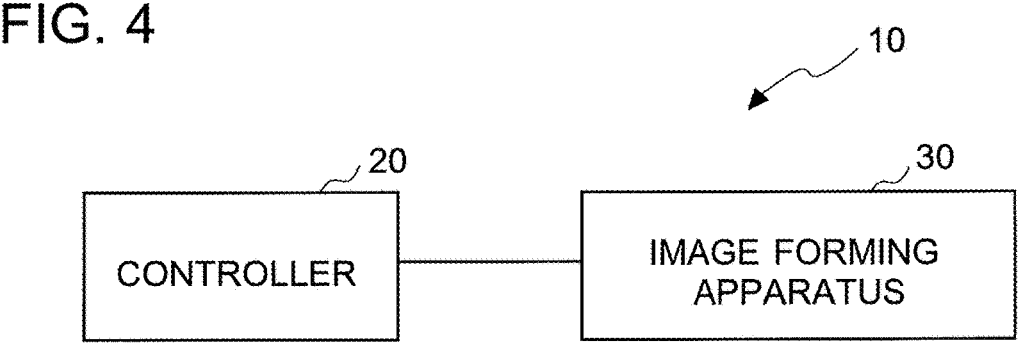
FIG. 4 is a block diagram of an example of the structure of a printing system according to Example 1.

As illustrated in FIG. 4, printing system 10 of the present example includes controller 20 (control device) and image forming apparatus 30, where controller 20 is configured to create a database to be used for a judgement whether or not to perform a feedback adjustment of a color correction LUT and image forming apparatus 30 is configured to print a color chart to be used for creating the database and to measure the color chart printed. Controller 20 and image forming apparatus 30 are communicably connected to each other.

Figure 5:
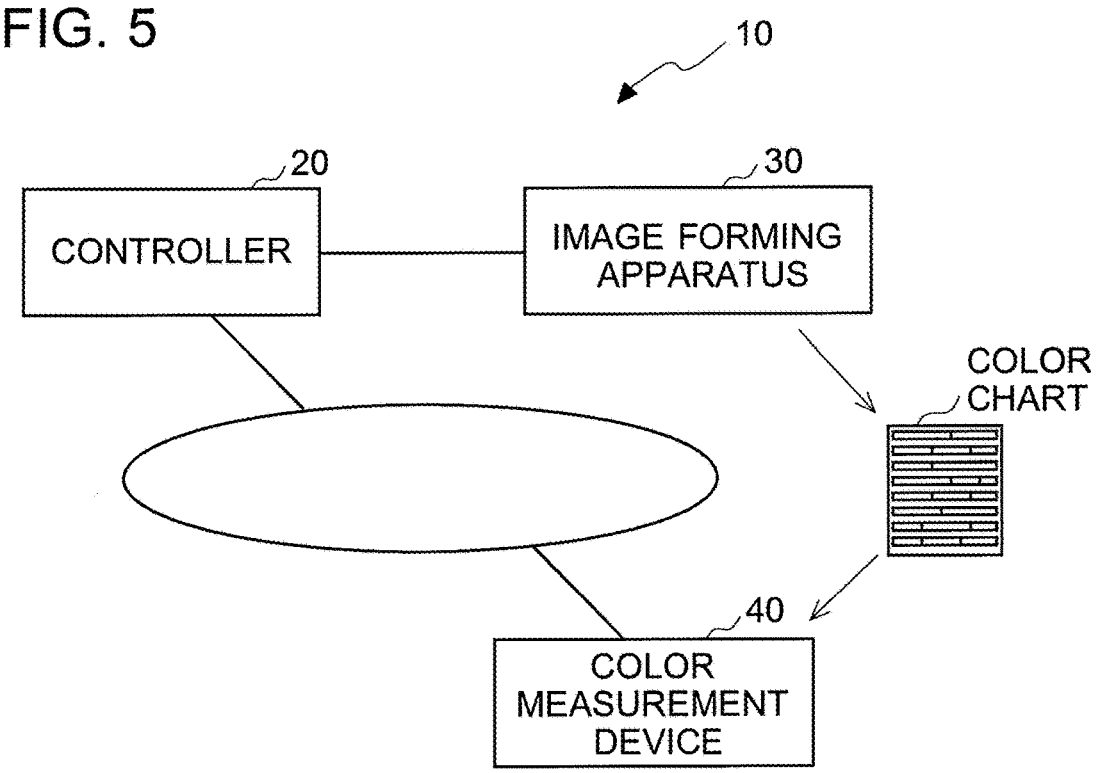
FIG. 5 is a block diagram of another example of the structure of a printing system according to Example 1.
Figure 6:
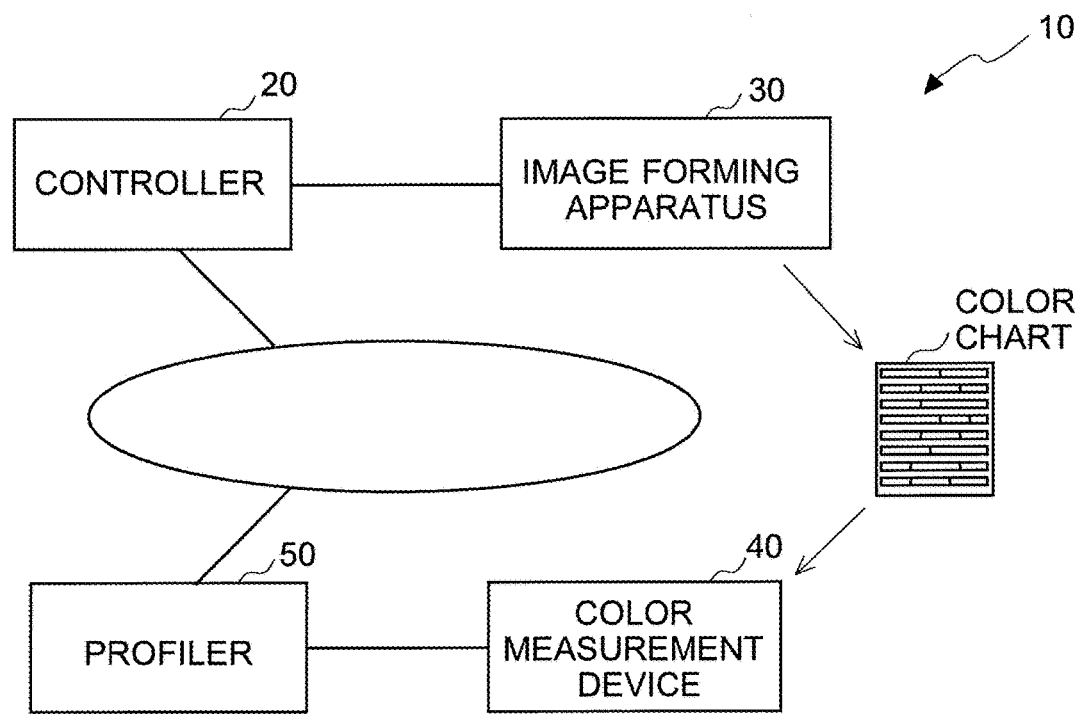
FIG. 6 is a block diagram of another example of the structure of a printing system according to Example 1.

FIG. 4 shows the structure of printing system 10 such that image forming apparatus 30 includes an in-line color measurement unit and is configured to print a color chart on a print medium and measure the printed color chart. As illustrated in FIG. 5, the printing system 10 may further include color measurement device 40 connected to controller 20 through a communication network, so as to measure a color chart printed on a print medium with color measurement device 40. As illustrated in FIG. 6, printing system 10 may further include profiler 50 connected to controller 20 through a communication network, so as to create a profile with profiler 50 by using data of color measurement obtained from color measurement device 40. Alternatively, if image forming apparatus 30 equipped with an in-line color measurement unit, includes a unit which serves as controller 20 (which can perform color calibration and create a database), in other words, image forming apparatus 30 works also as a control device that controls a printing unit and a color measurement unit, printing system 10 may be composed of just the image forming apparatus 30, as illustrated in FIG. 7. As an example of the communication network in the printing system 10, an Ethernet network may be used. Controller 20 and image forming apparatus 30 may be communicated to each other through a system conforming to the standards, such as IEEE 1394, parallel or the like. Hereinafter, a description of each apparatus is given on the assumption that printing apparatus 10 has the structure shown in FIG. 4.

Controller:

Controller 20 (control device) is a computing device, and includes, as illustrated in FIG. 8A, control unit 21 and storage unit 25, communication interface (I/F) unit 26, raster-image processor 27, display unit 28 and operation unit 29.

Control unit 21 includes CPU (Central Processing Unit) 22 as a hardware processor, and further includes memories, such as a ROM (Read Only Memory) 23 and a RAM (Random Access Memory) 24. These are connected to each other through a bus. ROM 23 stores programs and other data. RAM 24 stores data needed for control operations executed by CPU 22 and data needed to be temporarily stored in the control operations. CPU 22 is configured to control the overall operations of controller 20, when reading programs stored in ROM 23 or storage unit 25, loading the programs onto RAM 24, and executing the programs.

The control unit 21 also works as chart-print instructing section 21a, measurement-result obtaining section 21b, white-difference calculating section 21c, color-correction-LUT creating section 21d, feedback-adjustment controlling section 21e, resulting-color-accuracy calculating section 21f, and database creating section 21g, as illustrated in FIG. 8B.

Chart-print instructing section 21a is configured to perform the following operations. Chart-print instructing section 21a reads or obtains information of a type of print medium (a paper type) and a screen type to be used in color calibration which have been set by an operator through operation unit 29 (or which have been specified in a print job). Chart-print instructing section 21a further reads a color calibration target corresponding to the type of print medium and the screen type, from storage unit 25. Chart-print instructing section 21a then operates raster-image processor 27 to create an image of a color chart including an array of color patches, and instructs image forming apparatus 30 to print the color chart on a print medium, where the print medium is a certain print product among plural print products categorized as (belonging to) the type of print medium. The color chart can be a first color chart in which color patches are arrayed so that the tone value gradually changes separately for each of CMYK colors, which are the primary colors, or a second color chart in which colors of the patches are represented by combinations of CMY colors, which are the primary colors, each changing to various tone values. The first color chart is referred to as a color chart for creating one-dimensional color correction LUTs, and the first color chart to which one-dimensional color correction LUTs have been applied, is referred to as a color chart corrected with one-dimensional color correction LUTs. The second color chart is referred to as a color chart for creating a multidimensional color correction LUT, and the second color chart to which a multidimensional color correction LUT has been applied, is referred to as a color chart corrected with a multidimensional color correction LUT. A color calibration chart is a general term for these color charts.

Measurement-result obtaining section 21b is configured to obtain a result or data of color measurement (including color values, like L*a*b* values, of color patches) of a color calibration chart, from in-line color measurement unit of image forming apparatus 30 (or color measurement device 40, if in printing system 10 illustrated in FIG. 5 or FIG. 6).

White-difference calculating section 21c is configured to calculate a white-ground color difference, which is a color difference between color values of white color in a color calibration target and measured color values of the ground (a part corresponding to a which patch) of a print medium, obtained by color measurement of a color calibration chart. In concrete terms, the white-ground color difference is given by the following expression (2), where L*Target, a*Target and b*Target indicate color values (L*a*b* values) of white color in the color calibration target, and L*Measure, a*Measure and b*Measure indicate measured color values (L*a*b* values) of the ground color of a print medium, obtained by color measurement of a color calibration chart.

$$\text{White-ground color difference} = ((L^*\text{Target} - L^*\text{Measure})^2 + (a^*\text{Target} - a^*\text{Measure})^2 + (b^*\text{Target} - b^*\text{Measure})^2)^{1/2} \qquad (2)$$

Color-correction-LUT creating section 21d is configured to create a color correction LUT which makes measured color values of each patch color of a color calibration chart, close to color values of a corresponding color in the color calibration target.

Feedback-adjustment controlling section 21e is configured to control chart-print instructing section 21a, measurement-result obtaining section 21b, color-correction-LUT creating section 21d and resulting-color-accuracy calculating section 21f (and white-difference calculating section 21c, if needed), to perform a feedback adjustment of a color correction LUT. That is, feedback-adjustment controlling section 21e uses these sections to repeatedly carry out a sequence of the steps (referred to as a feedback adjustment) of: printing a color calibration chart which includes an array of patches of colors in the color calibration target corrected with the color correction LUT, measuring the color calibration chart, creating a color correction LUT based on the color measurement, and calculating a representative color difference which will be described later. Feedback-adjustment controlling section 21e further judges whether the color accuracy of color calibration has been improved in comparison with that given after the last feedback adjustment, on the basis of the representative color difference calculated by resulting-color-accuracy calculating section 21f which will be described later.

Resulting-color-accuracy calculating section 21f is configured to obtain a resulting color accuracy of color calibration by the following operations. In each repetition of the feedback adjustment, resulting-color-accuracy calculating section 21f calculates color differences between measured color values of patch colors of a color calibration chart (a color chart corrected with a multidimensional color correction LUT) and color values of respective colors in the color calibration target (by using the similar calculation as that of a white-ground color difference described above), and obtains a representative value (referred to as representative color difference) of the color differences. Among representative color differences obtained by the repetitions of the feedback adjustment, resulting-color-accuracy calculating section 21f chooses the smallest value as a resulting color accuracy of the color calibration. The representative color difference can be the mean of the color differences calculated for all the color patches of a color calibration chart (referred to the mean color difference of all color patches), the ninety-five percentile value of the color differences, the mean of the color differences obtained by removing the top or lowest five percent from the color differences calculated for all the color patches of a color calibration chart, or the largest color difference among the color differences (referred to as the maximum color difference). Alternatively, the representative color difference may be the mean of a predetermined number of largest color differences (which indicate a predetermined number of worst color accuracies) among the color differences calculated for all the color patches of a color calibration chart. For example, the mean of the largest ten color differences may be calculated as the representative color difference.

Database creating section 21g is configured to perform the following operations for each type of print medium. Database creating section 21g obtains resulting color accuracies (the smallest representative color differences) and white-ground color differences both calculated for plural paper products categorized as (belonging to) a certain type of print medium, and associates the resulting color accuracies with the white-ground color differences to obtain a mathematical relation which gives, from a certain white-ground color difference, a corresponding resulting color accuracy. In this example, the mathematical relation is given by the mathematical expression: Resulting color accuracy=White-ground color difference×Slope+Rise value. On the basis of the mathematical relation, database creating section 21g creates a database of information about a judgement of a feedback-adjustment necessity (in other words, a database to be used for a judgement of a necessity for a feedback adjustment of a color correction LUT), to store the database into storage unit 25 or a predetermined storage. Database creating section 21g further judges whether creation of the mathematical relations in the database has been completed for all types of print medium and all types of screen.

The mathematical relation can be prepared in development of printing devices by a printer manufacturer, by performing repetitions of the feedback adjustment of a color correction LUT on print media as plural paper products belonging to a certain type of print medium. The mathematical relation may be updated after shipment of the printing device, by using the resulting color accuracies obtained for print medium as paper products for which color calibration was performed. In consideration of a change of color values reproduced by the printing device, which can be made together with a change of the operating environment of the printing device, the rise value in the mathematical relation may be replaced with a value being slightly greater than the original rise value so as to include an offset corresponding to the change of color values (as a rise parameter). The mathematical relation may further include a truncation value (which means a value for truncation of repetitions of the feedback adjustment) indicating the offset from the resulting color accuracy (as a truncation parameter).

The chart-print instructing section 21a, measurement-result obtaining section 21b, white-difference calculating section 21c, color-correction-LUT creating section 21d, feedback-adjustment controlling section 21e, resulting-color-accuracy calculating section 21f, and database creating section 21g may be constituted as hardware devices. Alternatively, the chart-print instructing section 21a, measurement-result obtaining section 21b, white-difference calculating section 21c, color-correction-LUT creating section 21d, feedback-adjustment controlling section 21e, resulting-color-accuracy calculating section 21f, and database creating section 21g may be provided by a control program including instructions which cause the control unit 21 to function as these sections when being executed by CPU 22. That is, the control unit 21 may be configured to serve as the chart-print instructing section 21a, measurement-result obtaining section 21b, white-difference calculating section 21c, color-correction-LUT creating section 21d, feedback-adjustment controlling section 21e, resulting-color-accuracy calculating section 21f, and database creating section 21g, when CPU 22 executes the instructions of the control program.

Storage unit 25 includes a memory, such as a HDD (Hard Disk Drive), a SSD (Solid State Drive) or the like, which stores color-calibration target profiles, setup information of types of print medium or paper, setup information of screen, image data of color calibration charts, data of color measurement of color calibration charts, white-ground color differences, representative color differences, resulting color accuracies of color calibration, color correction LUTs, databases of information about a judgement of a feedback-adjustment necessity including information of the slope and rise value of the mathematical relation described above, and other data.

The color-calibration target profile is held for each type of print medium or paper (for example, plain paper, colored paper, fine paper, gloss-coated paper, matte-coated paper, and dull-coated paper) and for each type of screen (for example, Dot270, Dot190, Line200, Line180 and FM screen). Examples of the color-calibration target profile include a gray-balanced printer profile. The printer profile has a data structure conforming to ICC profiles, for example, a structure including the A2B table that converts from device-dependent color space to device-independent color space, for example, from CMYK values to Lab values, and the AtoB table that converts from device-independent color space to device-dependent color space, for example, from Lab values to CMYK values. The information about a judgement of a feedback-adjustment necessity is also held for each type of print medium or paper and for each type of screen. Since it is difficult to actually prepare and hold such kinds of data for all the combinations of the types of print medium and the screen types, data which were prepared for one type of print medium and one screen type can be substituted for other data for another type of print medium and another screen type.

Communication I/F unit 26 includes a NIC (Network Interface Card) and/or a modem and is configured to communicate with image forming apparatus 30 and optionally with color measurement device 40 if in printing system 10 illustrated in FIG. 5 or FIG. 6 and profiler 50 if in printing system 10 illustrated in FIG. 6.

Raster-image processor 27 is configured to perform color conversion on input data by using a color conversion table (for example, a color-calibration target profile or the like) and render to create raster or bitmap image data. A series of these processes is referred to as raster-image processing. Raster-image processor 27 is further configured to apply screening, tone correction density-balance adjustment, thinning and other processing on the bitmap image data, if they are needed.

Display unit 28 includes a display like a LCD (Liquid Crystal Display) or an OEL (organic electroluminescence) display, and is configured to display various screens for color calibration (for example, a setting screen for print medium types and screen types to be used for color calibration and a screen for print instructions of a color calibration chart) and other user interfaces.

Operation unit 29 includes hardware devices, such as a mouse and a keyboard, which allows an operator to perform various operations for color calibration (for example, operations to setup a print medium type and screen type to be used for color calibration, and operations to give print instructions of a color calibration chart). Image Forming Apparatus:

Image forming apparatus 30 is a printing device like a MFP (Multi-Functional Peripheral). Image forming apparatus 30 includes, as illustrated in FIG. 9, control unit 31, storage unit 35, communication interface (I/F) unit 36, display and operation unit 37, scanner unit 38 and printing unit 39.

Control unit 31 includes CPU 32 and memories, such as ROM 33 a RAM 34, where these components are connected with each other through a bus. ROM 33 stores programs and other data. RAM 34 stores data needed to be used for control operations performed by CPU 32, data to be temporarily recorded in the control operations, and other data. CPU 32 is configured to control the overall operations of image forming apparatus 30, when reading programs stored in ROM 33 or storage unit 35, loading the programs onto RAM 34, and executing the programs.

Storage unit 35 includes a memory, such as a HDD, a SSD or the like, which stores image data of color calibration charts, data of color measurement of color calibration charts and other data.

Communication I/F unit 36 includes a NIC and/or a modem and is configured to communicate with controller 20.

Display and operation unit 37 is a hardware device, such as a touch panel, which includes a display unit like a LCD or an OEL display and a touch sensor including transparent electrodes arranged in a lattice shape on the display unit. Display and operation unit 37 is configured to display various kinds of information about printing and allow an operator to perform various operations relating to printing.

Scanner unit 38 is an optional hardware component of image forming apparatus 30 and is configured to optically scan an original placed on a platen and obtain image data of the original. Scanner unit 38 includes a light source for scanning an original, an image sensor, like a CCD (Charge Coupled Device), that receives light reflected on the original and converts the light into electric signals, and an analog-digital convertor that performs analog-to-digital conversion on electric signals.

Printing unit 39 is a print engine that makes images on a print medium like paper according to an electrophotographic process, on the basis of image data received from controller 20. In concrete terms, printing unit 39 includes an image forming unit, a photoreceptor unit, an intermediate transfer belt, a second transfer roller, a fixing unit, and a conveyance unit. The image forming unit is configured to irradiate a photoreceptor drum with a laser beam according to image data and perform an exposure process. The photoreceptor unit includes a photoreceptor drum, a developing section, a charging section, a photoreceptor cleaning section, and a first transfer roller, and is configured to form on the photoreceptor drum a toner image in each of CMYK colors. The intermediate transfer belt is driven by rollers so as to work as an intermediate transfer body which conveys the toner images formed by the photoreceptor unit onto a print medium. The second transfer roller is configured to transfer the toner images on the second transfer roller onto a print medium. The fixing unit is configured to fix the images transferred on the print medium. The conveyance unit includes components for conveying print media, for example, a feed roller, a registration roller, a loop roller, a reverse roller, and an output roller.

The image forming apparatus 30 further includes in-line color measurement unit 39a in a conveyance path in the conveyance unit, so as to measure colors of color patches in a color calibration chart. Examples of the in-line color measurement unit 39a includes a color measurement instrument (spectrophotometer) supporting spectrophotometry which is capable of measuring a light intensity at each wavelength, similarly to color measurement device 40. In-line color measurement unit 39a outputs data (color values) of color measurement of a color calibration chart to control unit 31 so that the data is sent from control unit 31 to controller 20.

Color Measurement Device:

Color measurement device 40 is a device for measuring a color calibration chart. Examples of color measurement device 40 include a color measurement instrument (spectrophotometer) supporting spectrophotometry which is capable of measuring a light intensity at each wavelength. Color measurement device 40 is configured to measure a color calibration chart and output data (color values) of the color measurement to control unit 31 to controller 20 or profiler 50.

Profiler:

Profiler 50 is a computing device. Profiler 50 holds a color measurement program and is configured to, when executing the program, control color measurement device 40 to measure color patches of a color calibration chart, and obtain data (color values) of the color measurement from the color measurement device 40. Profiler 50 is further configured to send the obtained data of color measurement to controller 20 and create a profile by using the obtained data of color measurement.

It should be noted that FIG. 4 to FIG. 9 show examples of printing system 10 and its components of the present example for illustrative purpose only, and the structure of the system can be modified appropriately. For example, though the above descriptions gave printing system 10 such that in-line color measurement unit 39a is located in printing unit 39, in-line color measurement unit 39a can be omitted if printing system 10 includes color measurement device 40. For another example, though the above descriptions gave printing system 10 such that control unit 21 of controller 20 is configured to execute the control program for creating the database, control unit 31 or a processor of image forming apparatus 30 (or a control unit or processor of profiler 50) may be configured to execute the control program. For another example, though the above descriptions gave printing system 10 such that database creating section 21g of controller 20 is configured to create a database of information about a judgement of a feedback-adjustment necessity and store the database into storage unit 25 of controller 20, the database may be stored in an external storage or a cloud storage which can be accessed by a device configured to judge a feedback-adjustment necessity.

Next, a description is given of a procedure for creating a database of information about a judgement of a feedback-adjustment necessity, to be carried out by controller 20. CPU 22 of controller 20 reads a control program stored in ROM 23 or storage unit 25, loads the program onto RAM 24, and executes instructions in the program, thereby causing the control unit 21 to perform operations of steps in the flowcharts illustrated in FIG. 10 and FIG. 11.

Creation of Data for Establishing a Database:

As illustrated in FIG. 10, control unit 21 performs the following operations on print media as plural paper products belonging to a predetermined type of print medium, to obtain white-ground color differences and resulting color accuracies of the plural paper products, for the predetermined type of print medium. First, control unit 21 (chart-print instructing section 21a) reads or obtains information of a type of print medium (paper type) and screen type to be used for color calibration (S101), where the type of print medium and screen type were set by an operator through operation unit 29 (or specified in a print job). Control unit 21 (chart-print instructing section 21a) then obtains from storage unit 25 a color-calibration target profile (color calibration target) corresponding to the print medium type (paper type) and screen type (S102). Control unit 21 (chart-print instructing section 21a) then creates an image of a color chart for creating a multidimensional color correction LUT including an array of patches of colors in the color calibration target and sends image forming apparatus 30 instructions to print the image of the color chart for creating a multidimensional color correction LUT, on a print medium as one of the plural paper products belonging to the print medium type (S103).

Next, control unit 21 (measurement-result obtaining section 21b) obtains from image forming apparatus 30 data of color measurement of the printed color chart for creating a multidimensional color correction LUT, measured with in-line color measurement unit 39a (S104). In printing system 10 including color measurement device 40 as illustrated in FIG. 5 and FIG. 6, control unit 21 (measurement-result obtaining section 21b) may obtain from color measurement device 40 (or profiler 50 if the printing system as the structure shown in FIG. 6) the data of color measurement of the printed color chart for creating a multidimensional color correction LUT, measured with color measurement device 40.

Next, control unit 21 (white-difference calculating section 21c) uses color values of white in the color calibration target (for example, values of L*Target, a*Target and b*Target)

and measured color values of the ground (a part corresponding to a white color patch) of the print medium (for example, values of L*Measure, a*Measure and b*Measure) obtained by color measurement of the printed color chart for creating a multidimensional color correction LUT, to calculate a white-ground color difference from those color values by using the expression (2) described above (S105).

Next, control unit 21 (color-correction-LUT creating section 21d) creates a multidimensional color correction LUT which makes measured color values of each patch color of the color chart for creating a multidimensional color correction LUT, close to color values of a corresponding color in the color calibration target (in other words, a multidimensional color correction LUT which reduces a deviation of the measured color values of the color chart from color values of corresponding colors in the color calibration target) (S106). Control unit 21 (color-correction-LUT creating section 21d) records and registers the created multidimensional color correction LUT into storage unit 25 or a predetermined storage (S107).

Next, control unit 21 adjusts the created multidimensional color correction LUT by repeating a series of operations (a feedback adjustment of the multidimensional color correction LUT) until the color accuracy of color calibration is improved sufficiently or by repeating the operations the predetermined number of times. Control unit 21 (chart-print instructing section 21a) creates an image of a color chart prepared by applying the multidimensional color correction LUT to colors in the color calibration target, and instructs image forming apparatus 30 to print the color chart to which the multidimensional color correction LUT was applied (referred to as a corrected color calibration chart) on a print medium as one of the plural paper products belonging to the predetermined type of print medium (S108). Control unit 21 (measurement-result obtaining section 21b) obtains from image forming apparatus 30 data of color measurement of the color chart corrected with the multidimensional color correction LUT, measured with in-line color measurement unit 39a (S109). The data of color measurement is used for calculation of the color accuracy of color calibration, and creation of a multidimensional color correction LUT.

Next, control unit 21 (resulting-color-accuracy calculating section 21f) calculates color differences between measured color values of patch colors of the color chart corrected with the multidimensional color correction LUT, and color values of respective colors in the color calibration target, and obtains a representative color difference (color accuracy of color calibration) given by the current feedback adjustment, on the basis of these color differences (S110). As described above, the representative color difference can be the mean color difference of all color patches of the color calibration chart (the corrected color chart), the ninety-five percentile value of the color differences, the mean of the color differences obtained by removing the top or lowest five percent from the color differences calculated for all the color patches of the color calibration chart (the corrected color chart), or the maximum color difference. Alternatively, the representative color difference may be the mean of a predetermined number of largest color differences among the color differences calculated for all the color patches of the color calibration chart (the corrected color chart).

Next, control unit 21 (color-correction-LUT creating section 21d) creates a multidimensional color correction LUT which makes measured color values of each patch color of the color chart corrected with the multidimensional color correction LUT, close to color values of a corresponding color in the color calibration target (S111). Control unit 21 (color-correction-LUT creating section 21d) records and registers the created multidimensional color correction LUT into storage unit 25 or a predetermined storage (S112).

Next, control unit 21 (feedback-adjustment controlling section 21e) judges whether the color accuracy of color calibration has been improved in comparison with that obtained in the last feedback adjustment (S113). When judging that the color accuracy of color calibration has been improved in comparison with that obtained in the last feedback adjustment, the control unit 21 returns to step S108 and performs the succeeding feedback adjustment, because the succeeding feedback adjustment is expected to improve the color accuracy. On the other hand, when judging that the color accuracy of color calibration has not been improved in comparison with that obtained in the last feedback adjustment, the control unit 21 (database creating section 21g) stores the white-ground color difference calculated for the paper product calculated in step S105 and the representative color difference calculated in step S110 (as the resulting color accuracy of color calibration obtained for the paper product), while associating them with the print medium type (paper type) and the screen type obtained in step S101 (S114). Then the series of operations end. Though the above descriptions gave an example that when judging that the color accuracy of color calibration has not been improved in comparison with that obtained in the last feedback adjustment, the control unit 21 ends the series of operations, the control unit 21 may perform the following operations alternatively. That is, the control unit 21 may repeat the feedback adjustment a predetermined number of times and choose the best one of the color accuracies of color calibration (or the smallest one of the representative color differences) calculated in the repetitions of the feedback adjustment, as the resulting color accuracy. The control unit 21 may store the white-ground color difference and the resulting color accuracy calculated for the paper product, while associating them with the print medium type and the screen type obtained in step S101. The inventor has confirmed that, after ten repetitions of the feedback adjustment, the color calibration gives a reliable color accuracy. When judging that the color accuracy of color calibration has been improved in comparison with that obtained in the last feedback adjustment but the improvement is too small, the control unit 21 may judge that the color accuracy of color calibration has not been improved in comparison with that obtained in the last feedback adjustment.

Establishment of a Database:

A process of Establishment of a database is described with reference to FIG. 11. Control unit 21 (database creating section 21g) obtains from storage unit 25 or a predetermined storage resulting color accuracies of color calibration and white-ground color differences obtained for plural paper products, which were stored with being associated with the type of print medium (paper type) and screen type (S201).

Next, control unit 21 (database creating section 21g) plots the white-ground color differences on the x-axis and the resulting color accuracies on the y-axis for each type of print medium, and produces a linear approximation of a relationship between the white-ground color differences and the resulting color accuracies obtained for the paper products to obtain a linear equation "y=a×x+b", for the each type of print medium. Control unit 21 (database creating section 21g) then obtains a mathematical relation: Resulting color accuracy=White-ground color difference×Slope+Rise value (S202). Control unit 21 (database creating section 21g) then stores information of the slope and the rise value into storage unit 25 or a predetermined storage while associating it with the corresponding print medium type and screen type, to create a database to be used for a judgement of a feedback-adjustment necessity (S203). As described above, for the rise value in the mathematical relation, a value being slightly greater than the original rise value may be set as a recommendation value of a manufacturer, or the mathematical relation may include a truncation value indicating the offset from the resulting color accuracy separately from the rise value.

Next, control unit 21 (database creating section 21g) judges whether recording the approximate linear equations for all print medium types (paper types) and screen types into the database has been completed (S204). If there is any print medium type or screen type for which the approximate linear equation has not been recorded into the database, the control unit 21 returns to the step S201 and repeats the operations similarly. FIG. 12 shows an example of the database created by these operations. The database includes a set of values of the slope parameter and rise parameter (and optionally a value of the truncation parameter) as information about a judgment of a feedback-adjustment necessity for each combination of print medium type (paper type) and screen type. The database allows a computing device that judges a feedback-adjustment necessity to calculate an estimate of the resulting color accuracy to be given after a repetition of the feedback adjustment at a time of color measurement of the ground color of paper to be used for color calibration, which will be described in Example 2. It further allows the device to make a proper judgement of a feedback-adjustment necessity.

When printing system 10 includes plural devices equipped with a printing unit, the control section 21 may repeat the operations of the flowchart of FIG. 10 and FIG. 11 to create the database for each model of the devices and/or each of the individual devices.

Example 2

Figure 17:
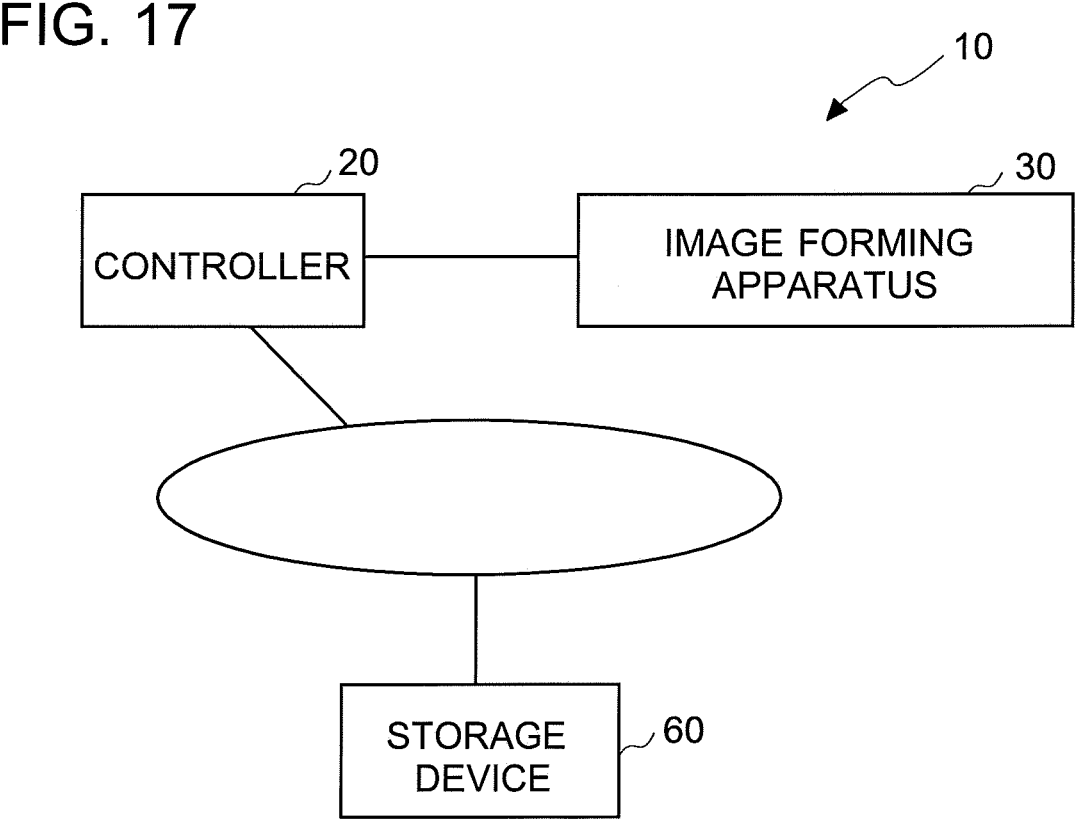
FIG. 17 is a block diagram of another example of the structure of a printing system according to Example 2.
Figure 18A:
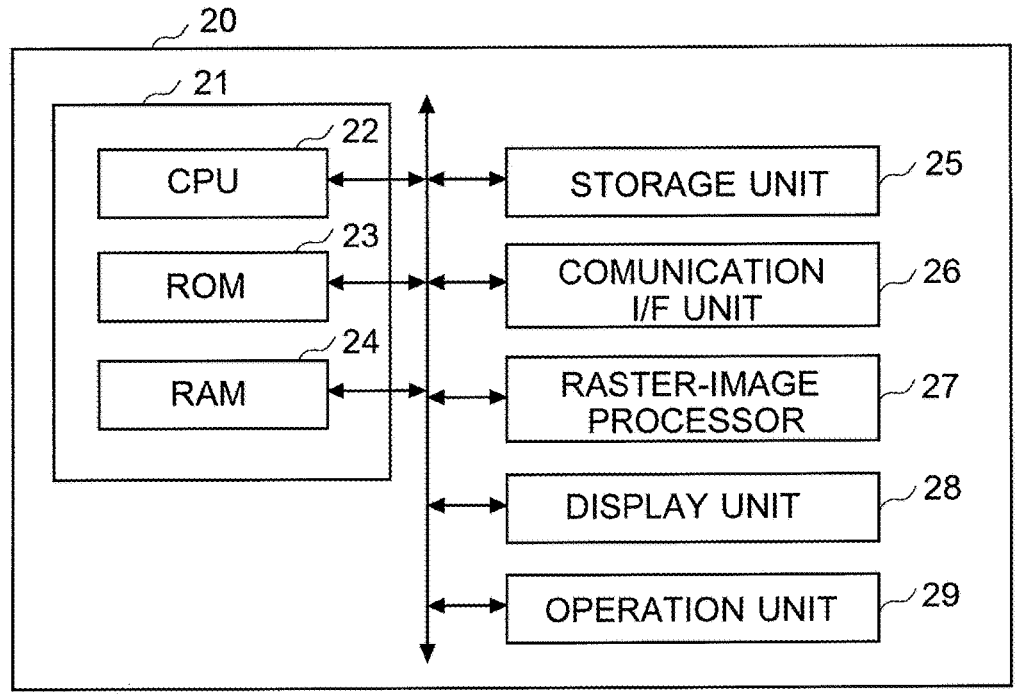
FIGS. 18A and 18B are block diagrams of an example of the structure of a controller in the printing system of FIG. 13, according to Example 2.
Figure 18B:
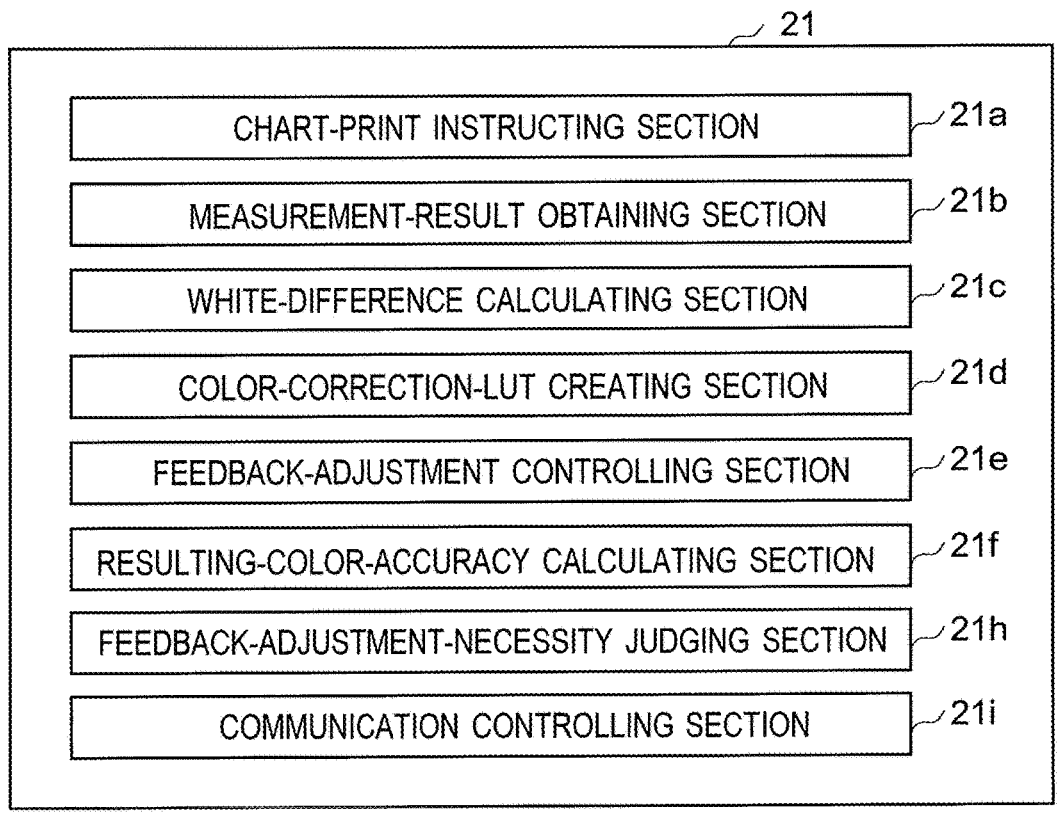
Figure 19:
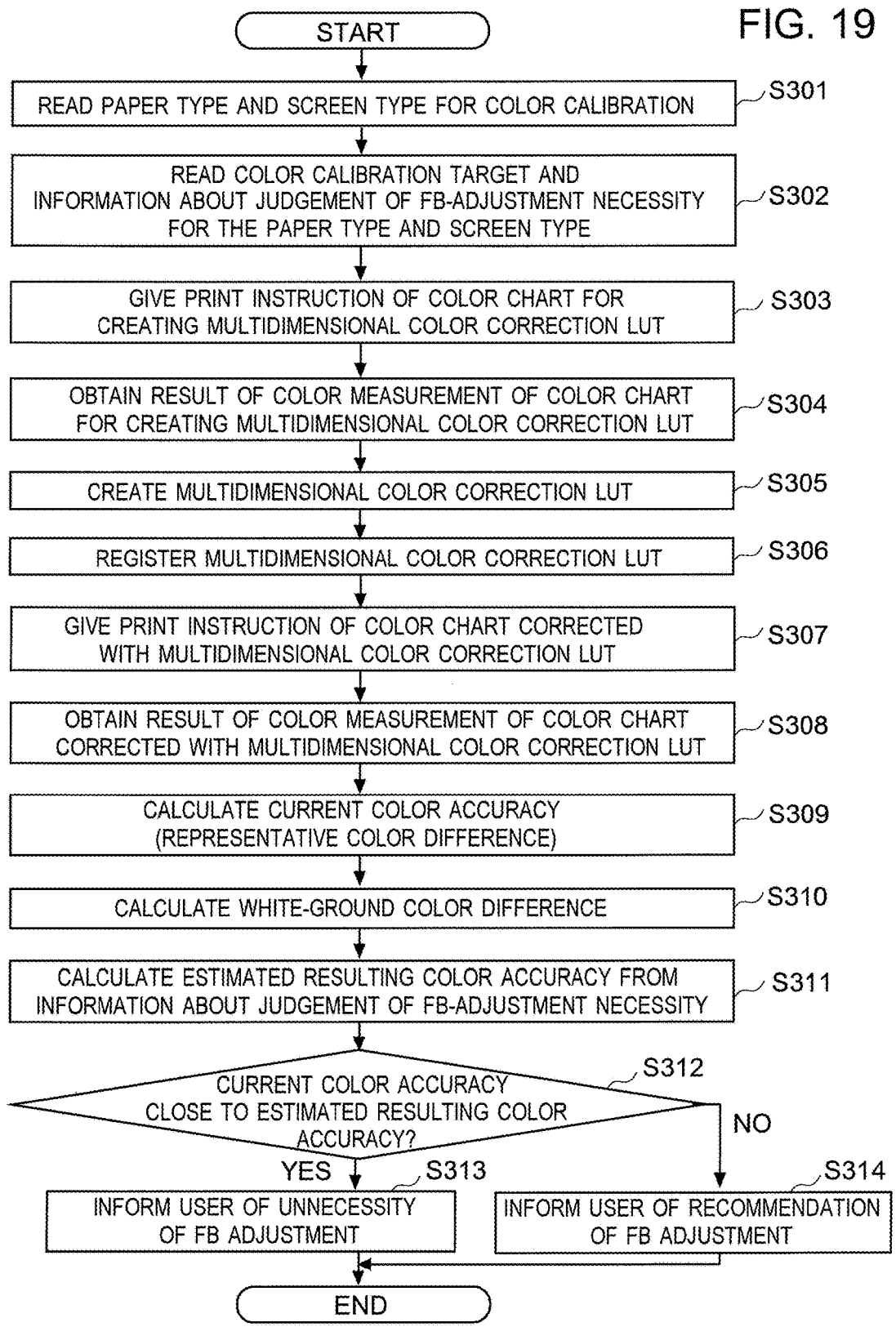
FIG. 19 is a flowchart illustrating an example of operations (judgement of a feedback-adjustment necessity) of the controller according to Example 2.
Figure 20:
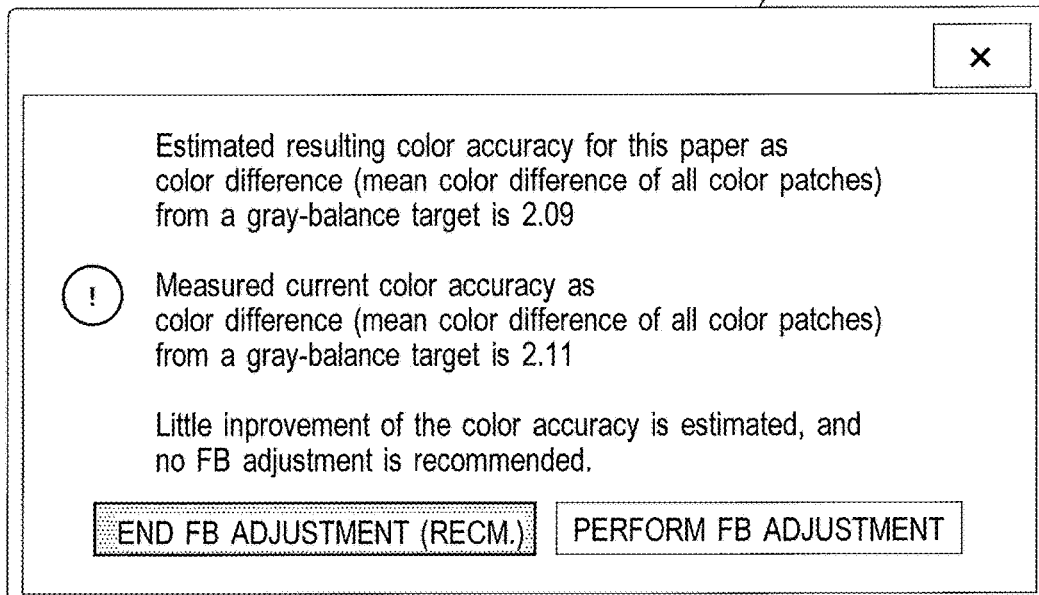
FIG. 20 is a diagram of an example of a notification screen for a judgement result of a feedback-adjustment necessity, according to Example 2.
Figure 21:
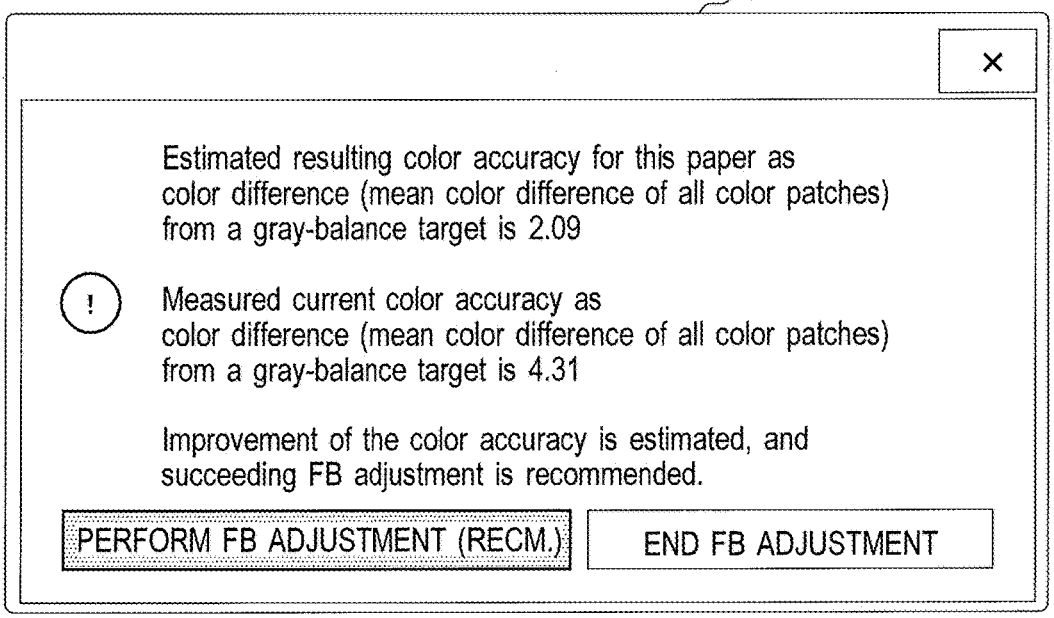
FIG. 21 is a diagram of another example of a notification screen for a judgement result of a feedback-adjustment necessity, according to Example 2.
Figure 22:
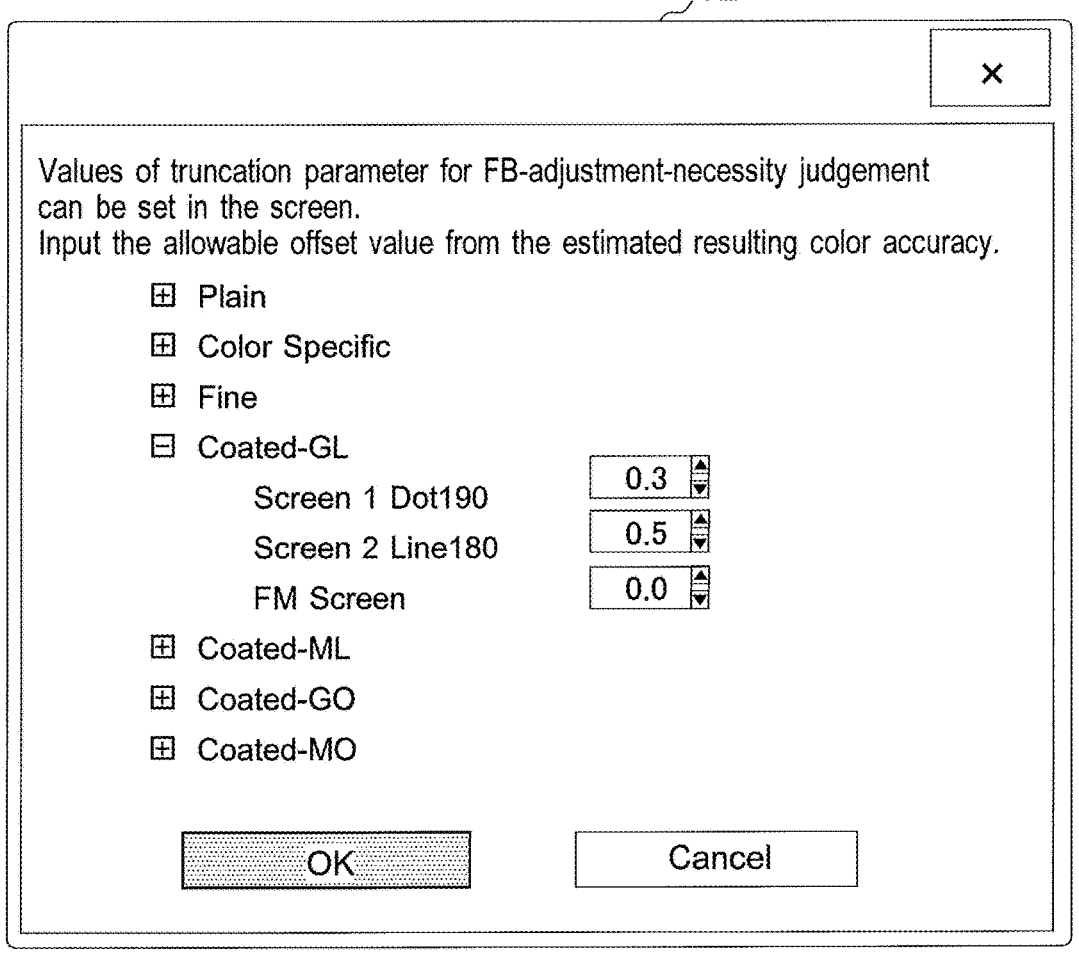
FIG. 22 is a diagram of an example of a setting screen for a truncation parameter according to Example 2.

Next, a description is given to non-transitory computer-readable storage media each storing a control program for color calibration, control devices and control methods according to Example 2, with reference to FIG. 13 to FIG. 22. Each of FIGS. 13 to 17 is a block diagram illustrating an example of the structure of a printing system according to Example 2. FIGS. 18A and 18B are block diagrams of an example of the structure of a controller in the printing system illustrated in FIG. 13. FIG. 19 is a flowchart illustrating an example of operations of the controller. Each of FIGS. 20 to 22 is a diagram illustrating an example of a screen to be displayed on a display unit of the controller. This example gives a description of a method of judging a feedback-adjustment necessity by using the database created in Example 1.

Figure 13:
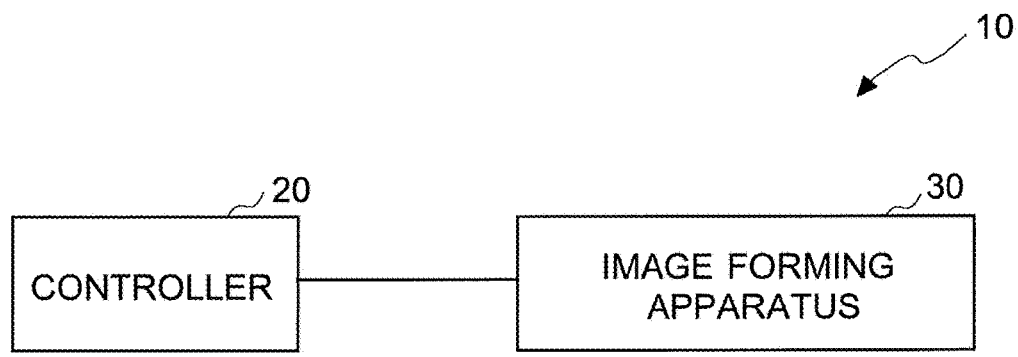
FIG. 13 is a block diagram of an example of the structure of a printing system according to Example 2.

As illustrated in FIG. 13, printing system 10 of the present example includes controller 20 (control device) and image forming apparatus 30, where controller 20 is configured to perform a feedback adjustment of a color correction LUT by using the database created in Example 1, and image forming apparatus 30 is equipped with an in-line color measurement unit and is configured to print a color chart to be used for color calibration and to measure the color chart printed. Controller 20 and image forming apparatus 30 are communicably connected to each other.

Figure 14:
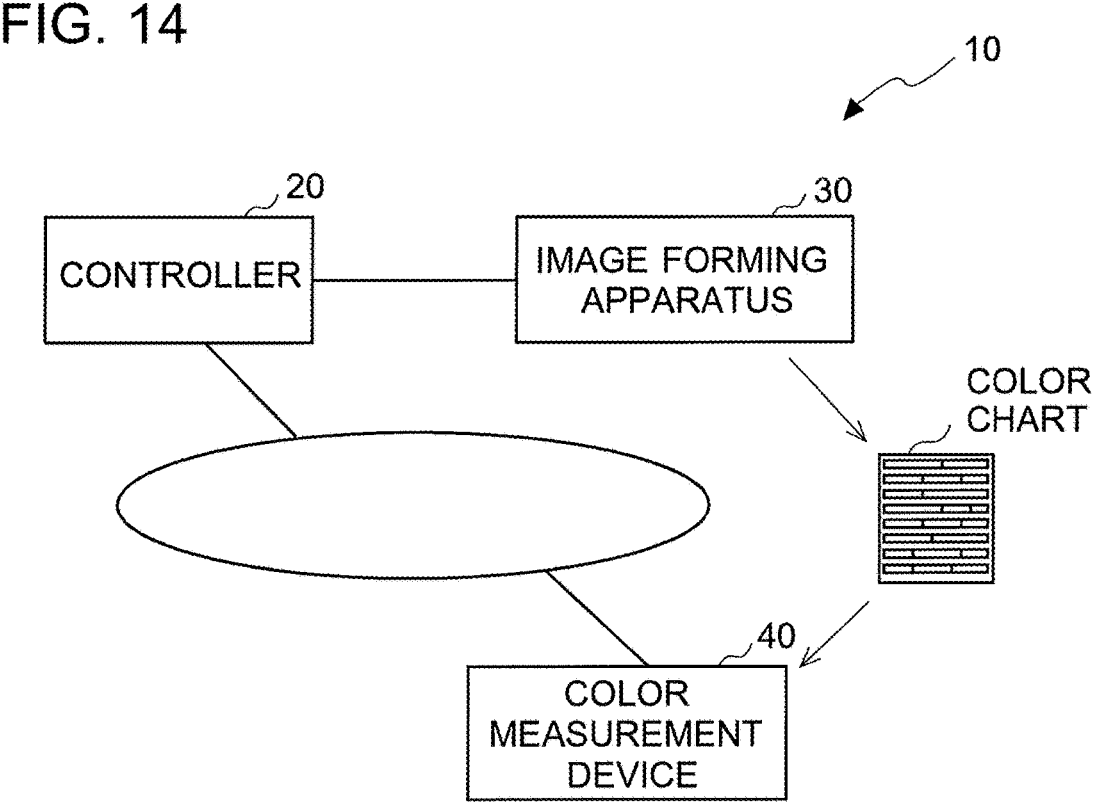
FIG. 14 is a block diagram of another example of the structure of a printing system according to Example 2.
Figure 15:
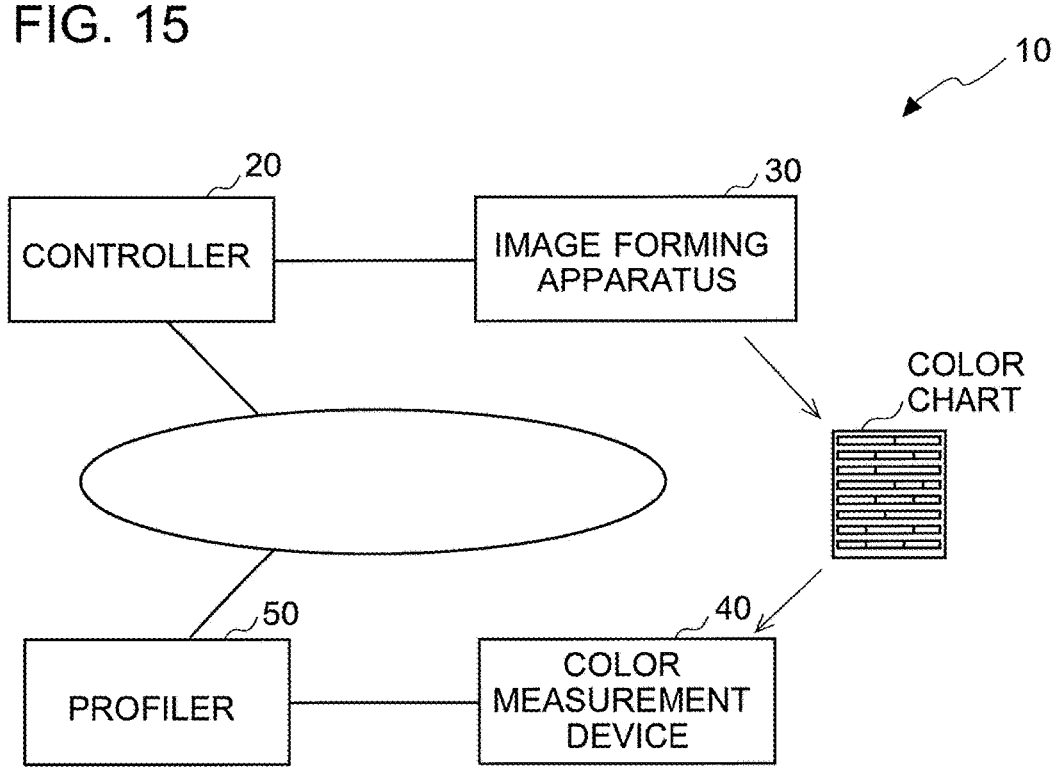
FIG. 15 is a block diagram of another example of the structure of a printing system according to Example 2.
Figure 16:
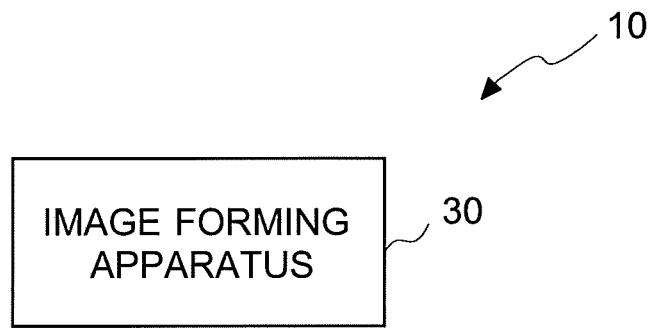
FIG. 16 is a block diagram of another example of the structure of a printing system according to Example 2.

FIG. 13 shows the structure of printing system 10 such that image forming apparatus 30 includes an in-line color measurement unit and is configured to print a color chart on a print medium and measure the printed color chart. As illustrated in FIG. 14, the printing system 10 may further include color measurement device 40 connected to controller 20 through a communication network, so as to measure a color chart printed on a print medium with color measurement device 40. As illustrated in FIG. 15, printing system 10 may further include profiler 50 connected to controller 20 through a communication network, so as to create a profile with profiler 50 by using data of color measurement obtained from color measurement device 40. Alternatively, if image forming apparatus 30 includes a unit which serves as controller 20 (which can perform color calibration and judge a feedback-adjustment necessity by using the database), in other words, image forming apparatus 30 works also as a control device that controls a printing unit and a color measurement unit, printing system 10 may be composed of just the image forming apparatus 30, as illustrated in FIG. 16. As illustrated in FIG. 17, the printing system 10 may include controller 20, image forming apparatus 30 equipped with in-line color measurement unit, and storage device 60 which can be accessed by controller 20, so as to store the database in storage device 60 and obtain the database with controller 20 from the storage device 60 to judge a feedback-adjustment necessity. Hereinafter, a description of printing system 10 is given on the assumption of that printing system 10 has the structure shown in FIG. 13. Descriptions about the structures of image forming apparatus 30, color measurement device 40 and profiler 50 are omitted in the present example because they are the same as the descriptions in Example 1.

Controller:

Controller 20 (control device) includes, as illustrated in FIG. 18A, control unit 21 and storage unit 25, communication interface (I/F) unit 26, raster-image processor 27, display unit 28 and operation unit 29.

Control unit 21 includes CPU 22 as a hardware processor, and further includes memories, such as a ROM 23 and a RAM 24. These are connected to each other through a bus. ROM 23 stores programs and other data. RAM 24 stores data needed for control operations executed by CPU 22 and data needed to be temporarily stored in the control operations. CPU 22 is configured to control the overall operations of controller 20, when reading programs stored in ROM 23 or storage unit 25, loading the programs onto RAM 24, and executing the programs.

The control unit 21 also works as chart-print instructing section 21a, measurement-result obtaining section 21b, white-difference calculating section 21c, color-correction-LUT creating section 21d, feedback-adjustment controlling section 21e, resulting-color-accuracy calculating section 21f, feedback-adjustment-necessity judging section 21h, and communication controlling section 21i, as illustrated in FIG. 18B.

Chart-print instructing section 21a is configured to perform the following operations, similarly to those in Example 1. Chart-print instructing section 21a reads or obtains information of a type of print medium (a paper type) type and a screen type to be used in color calibration which have been set by an operator through operation unit 29 (or which have been specified in a print job). Chart-print instructing section 21a further reads a color calibration target corresponding to the type of print medium and the screen type, from storage unit 25. Chart-print instructing section 21a then operates raster-image processor 27 to create an image of a color chart including an array of color patches, and instructs image forming apparatus 30 to print the color chart on a print medium, where the print medium is a certain print product categorized as (belonging to) the type of print medium. The color chart can be a first color chart in which color patches are arrayed so that the tone value gradually changes separately for each of CMYK colors, which are the primary colors, or a second color chart in which colors of the patches are represented by combinations of CMY colors, which are the primary colors, each changing to various tone values.

Measurement-result obtaining section 21b is configured to, similarly to Example 1, obtain a result or data of color measurement (including color values, like L*a*b* values, of color patches) of a color calibration chart, from in-line color measurement unit 39a of image forming apparatus 30 (color measurement device 40, if in printing system 10 illustrated in FIG. 14 or FIG. 15).

White-difference calculating section 21c is configured to, similarly to Example 1, calculate a white-ground difference between color values of white color in a color calibration target and measured color values of the ground (a part corresponding to a which patch) of a print medium, obtained by color measurement of the color calibration chart.

Color-correction-LUT creating section 21d is configured to, similarly to Example 1, create a color correction LUT which makes measured color values of each patch color of the color calibration chart, close to color values of a corresponding color in the color calibration target.

Feedback-adjustment controlling section 21e is configured to control chart-print instructing section 21a, measurement-result obtaining section 21b, white-difference calculating section 21c, color-correction-LUT creating section 21d and resulting-color-accuracy calculating section 21f, to repeat a feedback adjustment of a color correction LUT according to a judgement result given by feedback-adjustment-necessity judging section 21h. That is, feedback-adjustment controlling section 21e uses these sections to repeatedly carry out a sequence of the steps (referred to as a feedback adjustment) of: printing a color calibration chart which includes an array of patches of colors in the color calibration target corrected with a color correction LUT, measuring the printed color calibration chart, creating a color correction LUT based on the color measurement, and calculating a representative color difference.

Resulting-color-accuracy calculating section 21f is configured to obtain a resulting color accuracy of color calibration by the following operations, similarly to Example 1. In each repetition of the feedback adjustment, resulting-color-accuracy calculating section 21f calculates color differences between measured color values of patch colors of a color calibration chart and color values of respective colors in the color calibration target, and obtains a representative value (referred to as representative color difference) of the color differences. Among representative color differences obtained by the repetitions of the feedback adjustment, resulting-color-accuracy calculating section 21f chooses the smallest value as a resulting color accuracy of the color calibration. The representative color difference can be the mean color difference of all color patches of a color calibration chart, the ninety-five percentile value of the color differences calculated for all the color patches, the mean of the color differences obtained by removing the top or lowest five percent from the color differences calculated for all the color patches, or the largest color difference among the color differences calculated for all the color patches (referred to as the maximum color difference). Alternatively, the representative color difference may be the mean of a predetermined number of largest color differences (which indicate a predetermined number of worst color accuracies) among the color differences calculated for all the color patches of a color calibration chart. For example, the mean of the largest ten color differences may be calculated as the representative color difference.

Feedback-adjustment-necessity judging section 21h is configured to perform the following operations. Feedback-adjustment-necessity judging section 21h refers to the database stored in storage unit 25 (or external storage device 60 if in printing system 10 illustrated in FIG. 17) to obtain an estimate of the resulting color accuracy (referred to as an estimated resulting color accuracy) corresponding to the white-ground color differences calculated for a print medium by white-difference calculating section 21c. Feedback-adjustment-necessity judging section 21h then compares the estimated resulting color accuracy with the current color accuracy of color calibration (the representative color difference given by the current feedback adjustment) calculated by resulting-color-accuracy calculating section 21f, to judge a necessity of a feedback adjustment of a multidimensional color correction LUT. In concrete terms, feedback-adjustment-necessity judging section 21h judges that a succeeding feedback adjustment is necessary if the current color accuracy is sufficiently far from the estimated resulting color accuracy, and feedback-adjustment-necessity judging section 21h judges that a succeeding feedback adjustment is unnecessary if the current color accuracy is sufficiently close to the estimated resulting color accuracy.

A description of the judgement is given with reference to the graph shown in FIG. 3. In color calibration using a paper product belonging to a certain type of print medium, resulting-color-accuracy calculating section 21f first gives the color accuracy of the color calibration, being greater than (in other words, located above) the approximation line, and then, as the control unit 21 repeats the feedback adjustment again and again, the color accuracy calculated in each the feedback adjustment gradually approaches the approximation line. When the distance between the current color accuracy and the approximation line becomes not greater than the predetermined threshold value (in other words, the current color accuracy becomes sufficiently close to the approximation line), feedback-adjustment-necessity judging section 21h judges that the effect (the color accuracy) of the color calibration is not expected to be improved even if the feedback adjustment is further more repeated, and that there is no need to perform a succeeding feedback adjustment. When the database does not include information about a judgement of a feedback-adjustment necessity prepared for the type of print medium currently used in the color calibration, feedback-adjustment-necessity judging section 21h can specify a print medium type closest to the current print medium type among the print medium types stored in the database, on the basis of the amount of toner to be adhered to each types of print medium or other information, and then judges the feedback-adjustment necessity by using the information about a judgement of a feedback-adjustment necessity prepared for the specified type of print medium.

Communication controlling section 21i is configured to output or notify the estimated resulting color accuracy, the current color accuracy of color calibration and information that a succeeding feedback adjustment is necessary, to an operator, if the current color accuracy of color calibration is sufficiently far from the approximation line; and to output or notify the estimated resulting color accuracy, the current color accuracy of color calibration and information that a succeeding feedback adjustment is unnecessary, to an operator, if the current color accuracy of color calibration is sufficiently close to the approximation line. To output the information about the judgement result, communication controlling section 21*i* may use display unit 28 to display a notification screen for the judgement result of a feedback-adjustment necessity, which will be described later; may control an output unit, like a speaker prepared in controller 20 to output a voice announcing the result of the judgement of a feedback-adjustment necessity; or may control an output unit, like a lamp or an indicator, prepared in controller 20 to light or blink the lamp or indicator according to the result of the judgement of a feedback-adjustment necessity.

The chart-print instructing section 21*a*, measurement-result obtaining section 21*b*, white-difference calculating section 21*c*, color-correction-LUT creating section 21*d*, feedback-adjustment controlling section 21*e*, resulting-color-accuracy calculating section 21*f*, feedback-adjustment-necessity judging section 21*h*, and communication controlling section 21*i* may be constituted as hardware devices. Alternatively, the chart-print instructing section 21*a*, measurement-result obtaining section 21*b*, white-difference calculating section 21*c*, color-correction-LUT creating section 21*d*, feedback-adjustment controlling section 21*e*, resulting-color-accuracy calculating section 21*f*, feedback-adjustment-necessity judging section 21*h*, and communication controlling section 21*i* may be provided by a control program including instructions which cause the control unit 21 to function as these sections when being executed by CPU 22. That is, the control unit 21 may be configured to serve as the chart-print instructing section 21*a*, measurement-result obtaining section 21*b*, white-difference calculating section 21*c*, color-correction-LUT creating section 21*d*, feedback-adjustment controlling section 21*e*, resulting-color-accuracy calculating section 21*f*, feedback-adjustment-necessity judging section 21*h*, and communication controlling section 21*i*, when CPU 22 executes the instructions of the control program.

Storage unit 25 stores, similarly to Example 1, color-calibration target profiles, setup information of types of print medium or paper, setup information of screen, image data of color calibration charts, data of color measurement of color calibration charts, white-ground color differences, representative color differences, resulting color accuracies of color calibration, color correction LUTs, databases of information about a judgement of a feedback-adjustment necessity including information of the slope and rise value of the mathematical relation described above, and other data.

As described above, the color-calibration target profile and the information about a judgement of a feedback-adjustment necessity may be held for each type of print medium or paper (for example, plain paper, colored paper, fine paper, gloss-coated paper, matte-coated paper, and dull-coated paper) and for each type of screen (for example, Dot270, Dot190, Line200, Line180 and FM screen). Further, the data of the color-calibration target profile or the information about a judgement of a feedback-adjustment necessity which were prepared for one type of print medium and one screen type may be substituted for other data for another print medium type and another screen type.

Communication I/F unit 26 is configured to, similarly to Example 1, communicate with image forming apparatus 30 and optionally with color measurement device 40 if in printing system 10 illustrated in FIG. 14 or FIG. 15, profiler 50 if in printing system 10 illustrated in FIG. 15, and storage device 60 if in printing system 10 illustrated in FIG. 17.

Raster-image processor 27 is configured to, similarly to Example 1, perform color conversion on input data by using a color conversion table (for example, a color-calibration target profile or the like) and render to create raster or bitmap image data. Raster-image processor 27 is further configured to apply screening, tone correction density-balance adjustment, thinning and other processing on the bitmap image data, if they are needed.

Display unit 28 is configured to display various screens for color calibration (for example, a setting screen for print medium types and screen types to be used for color calibration, a screen for print instructions of a color calibration chart, and a notification screen for the judgement result of a feedback-adjustment necessity) and other user interfaces.

Operation unit 29 allows an operator to perform various operations for color calibration (for example, operations to setup a print medium type and screen type to be used for color calibration, operations to give print instructions of a color calibration chart, and operations to give instructions to perform or end a feedback adjustment).

It should be noted that FIG. 13 to FIG. 17 show examples of printing system 10 and its components of the present example for illustrative purpose only, and the structure of the system can be modified appropriately. For example, though the above descriptions gave printing system 10 such that control unit 21 of controller 20 is configured to execute the control program, control unit 31 or a processor of image forming apparatus 30 (or a control unit or processor of profiler 50) may be configured to execute the control program.

Next, a description is given of a procedure for judging a feedback-adjustment necessity in color calibration, to be carried out by controller 20. CPU 22 of controller 20 reads a control program stored in ROM 23 or storage unit 25, loads the program onto RAM 24, and executes instructions in the program, thereby causing the control unit 21 to perform operations of steps in the flowchart illustrated in FIG. 19.

Judgement of a Feedback-Adjustment Necessity:

Control unit 21 performs a feedback adjustment of a multidimensional color correction LUT on the basis of the database created in the operations shown in the flowchart of FIG. 11. Similarly to Example 1, control unit 21 (chart-print instructing section 21*a*) reads or obtains information of a print medium type (paper type) and screen type to be used for color calibration (S301), where the print medium type and screen type were set by an operator through operation unit 29 (or specified in a print job). Control unit 21 (chart-print instructing section 21*a*) then obtains from storage unit 25 a color-calibration target profile (color calibration target) and information about a judgement of a feedback-adjustment necessity, corresponding to the print medium type (paper type) and screen type (S302).

Control unit 21 (chart-print instructing section 21*a*) then creates an image of a color chart for creating a multidimensional color correction LUT including an array of patches of colors in the color calibration target and sends image forming apparatus 30 instructions to print the image of the color chart for creating a multidimensional color correction LUT, on a print medium as one of the plural paper products belonging to the print medium type (S303). Next, control unit 21 (measurement-result obtaining section 21*b*) obtains from image forming apparatus 30 data of color measurement of the color chart for creating a multidimensional color correction LUT, measured with in-line color measurement unit 39*a* or the like (S304). Next, control unit 21 (color-correction-LUT creating section 21*d*) creates a multidimensional color correction LUT which makes measured color values of each patch color of the color chart for creating a multidimensional color correction LUT, close to color values of a corresponding color in the color calibration target (in other words, a multidimensional color correction LUT which reduces a deviation of the measured color values of the color chart from color values of corresponding colors in the color calibration target (S305). Control unit 21 (color-correction-LUT creating section 21d) records and registers the created multidimensional color correction LUT into storage unit 25 or a predetermined storage (S306). When the control unit 21 performs the judgement of a feedback-adjustment necessity after the establishment of the database according to the operations in FIG. 11 in Example 1 (and is capable of using a multidimensional color correction LUT created in the creation of data for establishment of the database in Example 1), the control unit 21 may omit the operations of S303 to S306 and perform the following operations by using the multidimensional color correction LUT given by the creation of data for establishment of the database according to the operations in FIG. 10 in Example 1 (for example, the control unit 21 may use the multidimensional color correction LUT created in the last repetition of the feedback adjustment in the creation).

Next, control unit 21 adjusts the multidimensional color correction LUT by repeating a feedback adjustment of the multidimensional color correction LUT. Control unit 21 (chart-print instructing section 21a) creates an image of a color chart prepared by applying the multidimensional color correction LUT to colors in the color calibration target, and instructs image forming apparatus 30 to print the color chart to which the multidimensional color correction LUT was applied, on a print medium as one of the plural paper products belonging to the print medium type (S307).

Next, control unit 21 (measurement-result obtaining section 21b) obtains from image forming apparatus 30 data of color measurement of the color chart corrected with the multidimensional color correction LUT, measured with in-line color measurement unit 39a (S308). The data of color measurement is used for calculation of the color accuracy of color calibration, and creation of a multidimensional color correction LUT. In printing system 10 including color measurement device 40 as illustrated in FIG. 14 and FIG. 15, control unit 21 (measurement-result obtaining section 21b) may obtain from color measurement device 40 (or profiler 50 if the printing system as the structure shown in FIG. 15) the data of color measurement of the color chart corrected with the multidimensional color correction LUT, measured with color measurement device 40.

Next, control unit 21 (resulting-color-accuracy calculating section 21f) calculates color differences between measured color values of patch colors of the color chart corrected with the multidimensional color correction LUT, and color values of respective colors in the color calibration target, and calculates the mean of the color differences to obtain a representative color difference (the color accuracy of color calibration) (S309). As described above, the representative color difference can be the mean color difference of all color patches of the color calibration chart (the corrected color chart), the ninety-five percentile value of the color differences, the mean of the color differences obtained by removing the top or lowest five percent from the color differences calculated for all the color patches of the color calibration chart (the corrected color chart), or the maximum color difference. Alternatively, the representative color difference may be the mean of a predetermined number of largest color differences among the color differences calculated for all the color patches of the color calibration chart (the corrected color chart).

Next, control unit 21 (white-difference calculating section 21c) uses color values of white in the color calibration target (for example, values of L*Target, a*Target and b*Target) and measured color values of the ground (a part corresponding to a white color patch) of the print medium (for example, values of L*Measure, a*Measure and b*Measure) obtained by color measurement of the color chart corrected with the multidimensional color correction LUT, to calculate a white-ground color difference from those color values by using the expression (2) described above (S310).

Next, control unit 21 (feedback-adjustment-necessity judging section 21h) uses the information about a judgement of a feedback-adjustment necessity obtained in S302 to calculate an estimated resulting color accuracy corresponding to the white-ground color difference calculated for the print medium as the print medium as the paper product belonging to the print medium type, which was calculated in S310 (S311). Control unit 21 (feedback-adjustment-necessity judging section 21h) then judges whether the current color accuracy of color calibration calculated in S309 is sufficiently close to the estimated resulting color accuracy (S312), uses an output unit (for example, display unit 28) to output or notify a result of the judgement to an operator, and receives operator's instructions to perform or end a succeeding feedback adjustment. If the current color accuracy is sufficiently close to the estimated resulting color accuracy, control unit 21 (feedback-adjustment-necessity judging section 21h) judges that the current color accuracy has reached the estimated resulting color accuracy and notifies information that a succeeding feedback adjustment is unnecessary to an operator (S313). On the other hand, if the current color accuracy is sufficiently far from the estimated resulting color accuracy, control unit 21 (feedback-adjustment-necessity judging section 21h) judges that the current color accuracy has not reached yet the estimated resulting color accuracy and notifies information to recommend performing a succeeding feedback adjustment to an operator (S314).

FIG. 20 illustrates an example of notification screen 70 for a judgement result of a feedback-adjustment necessity, which notifies information that a succeeding feedback adjustment is unnecessary to an operator, and FIG. 21 illustrates an example of notification screen 71 for a judgement result of a feedback-adjustment necessity, which notifies information to recommend performing a succeeding feedback adjustment to an operator. Each of these notification screens 70, 71 for a judgement result of a feedback-adjustment necessity shows a message announcing a feedback-adjustment necessity to an operator, buttons for instructing to perform or end a succeeding feedback adjustment, and other user interfaces. In the notification screen 70 which notifies information that a succeeding feedback adjustment is unnecessary to an operator, the button for instructing to perform a succeeding feedback adjustment may indicate the word "recom." or "recommended" and/or the button may be highlighted. In the notification screen 71 which notifies information to recommend performing a succeeding feedback adjustment to an operator, the button for instructing to end a succeeding feedback adjustment may indicate the word "recom." or "recommended" and/or the button may be highlighted. Finding such notification, an operator defines whether to perform or end a succeeding feedback adjustment and gives instructions to perform or end a succeeding feedback adjustment to controller 20 through operation unit 29. On receiving instructions to perform a succeeding feedback adjustment, control unit 21 (feedback-adjustment controlling section 21e) creates a multidimensional color correction LUT which makes measured color values of each patch color of the color chart corrected with the multidimensional color correction LUT, close to color values of a corresponding color in the color calibration target. Control unit 21 (feedback-adjustment controlling section 21e) then returns to S307 to perform the succeeding feedback adjustment so as to continue a repetition of feedback adjustment.

In the above-described follow, control unit 21 (feedback-adjustment-necessity judging section 21h) judges a feedback-adjustment necessity by using the database stored in storage unit 25 or a predetermined storage in advance. Alternatively, control unit 21 may prompt an operator to input a value of the truncation parameter, at a certain time, for example, before the calculation of the estimated resulting color accuracy in S311, after displaying the notification screen 70 or 71 for a judgement result of a feedback-adjustment necessity, or at a time when creating the database in Example 1. FIG. 22 illustrates an example of a setting screen for the truncation parameter, on which an operator can set a value of the truncation parameter for each type of print medium and each screen type. Alternatively, the setting screen for the truncation parameter may indicate the value of the truncation parameter which was set for one combination of a print medium type and a screen type.

As described above, control unit 21 or the processor of controller 20 refers to the database stored in storage unit 25 or a predetermined storage, judges a feedback-adjustment necessity by comparing the current color accuracy of color calibration (representative color difference) with the estimated resulting color accuracy, and outputs the judgement result about the feedback adjustment necessity to an operator. It allows an operator to make a judgement whether to perform or end a succeeding feedback adjustment easily and properly, and avoids a drawback that a succeeding feedback adjustment is performed even when a succeeding feedback adjustment is not estimated to improve the color accuracy of the color calibration or the feedback adjustment is ended even when the succeeding feedback adjustment is estimated to improve the color accuracy of the color calibration, before an occurrence of the drawback.

Example 3

Figure 23:
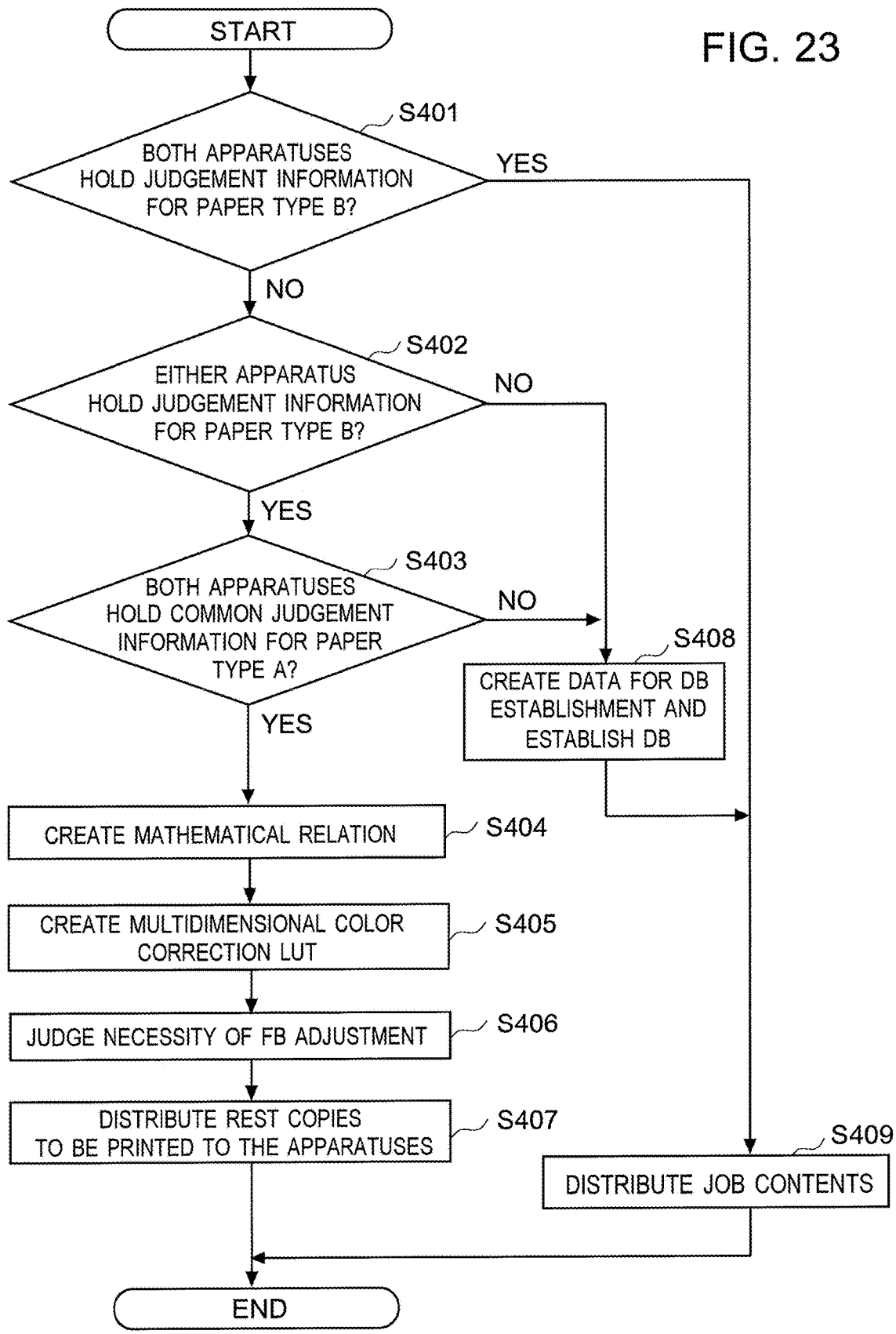
FIG. 23 is a flowchart illustrating an example of operations of the controller according to Example 3.

Next, a description is given to non-transitory computer-readable storage media each storing a control program for color calibration, control devices and control methods according to Example 3, with reference to FIG. 23. FIG. 23 is a flowchart illustrating an example of operations of the controller.

In general color calibration, it takes a lot of time before the completion of the color calibration in most cases. Particularly, before print processing is executed with plural image forming apparatuses, all the image forming apparatuses need to be calibrated and such color calibration takes a lot of time. From the background, there is a demand for a proposal of a method of distributing efficiently the contents of a print job among the image forming apparatuses in a printing system.

In view of that, Example 3 gives a description of an example of a control method for use in a printing system including first image forming apparatus 30a, second image forming apparatus 30b and controller 20 configured to control the image apparatuses and distribute the contents of a print job between the image forming apparatuses. In the printing system, a storage unit of any one of controller 20, first image forming apparatus 30a, second image forming apparatus 30b stores a program for controlling first image forming apparatus 30a, second image forming apparatus 30b and controller 20 as one group.

In the present example, it is assumed that first image forming apparatus 30a includes storage unit 35a storing information about a judgement of a feedback-adjustment necessity for print medium types A and B in a database, second image forming apparatus 30b includes storage unit 35b storing information about a judgement of a feedback-adjustment necessity for print medium type A in a database. Controller 20 (control device) is configured to manage the information about a judgement of a feedback-adjustment necessity in the both image forming apparatuses and create a mathematical relation between the first image forming apparatus 30a and second image forming apparatus 30b.

Next, a description of operations (distribution of the contents of a print job) of controller 20 (control device) is given. CPU 22 in control unit 21 of controller 20 reads a control program stored in ROM 23 or storage unit 25, loads the program onto RAM 24, and executes instructions in the program, thereby causing the control unit 21 to perform operations of steps in the flowchart illustrated in FIG. 23.

First, in response to receiving operator's instructions to make a large quantity of prints by using paper of the print medium type B, control unit 21 judges whether the information about a judgement of a feedback-adjustment necessity for print medium type B is recorded in both of first image forming apparatus 30a and second image forming apparatus 30b as the destinations of the distribution (S401).

If the judgement in S401 results in "Yes", control unit 21 distributes the contents of a print job among first image forming apparatus 30a and second image forming apparatus 30b, according to the throughputs, amounts of consumables and working conditions of these apparatuses (S409).

If the judgement in S401 results in "No", control unit 21 judges whether the information about a judgement of a feedback-adjustment necessity for print medium type B is recorded in either of first image forming apparatus 30a and second image forming apparatus 30b (S402).

If the judgement in S402 results in "No", control unit 21 performs the operations of creation of data for establishment of the database given in Example 1, shown in FIG. 10, and the operation of establishment of the database give in Example 1, shown in FIG. 11, on the both image forming apparatuses (S408), and then distributes the contents of the print job among the both image forming apparatuses (S409).

If the judgement in S402 results in "Yes", control unit 21 judges whether the both image forming apparatuses hold common information about a judgement of a feedback-adjustment necessity for print medium type A (S403).

If the judgement in S403 results in "No", control unit 21 performs the operations of creation of data for establishment of the database given in Example 1, shown in FIG. 10, and the operation of establishment of the database given in Example 1, shown in FIG. 11, on one of the image forming apparatuses, which does not hold the information about a judgement of a feedback-adjustment necessity for print medium type B (S408), and then distributes the contents of the print job among the both image forming apparatuses (S409).

If the judgement in S402 results in "Yes", control unit 21 uses a difference of the common information about a judgement of a feedback-adjustment necessity for print medium type A to create a mathematical relation of the information between the both image forming apparatuses (S404), and at the same time, distributes a part of the contents of the print job to first image forming apparatuses 30a.

Next, control unit 21 estimates the information about a judgement of a feedback-adjustment necessity for print medium type B for second image forming apparatus 30b, on the basis of the mathematical relation created in the above step and the information about a judgement of a feedback-adjustment necessity for print medium type B for first image forming apparatus 30a, and creates a multidimensional color correction LUT (S405 in FIG. 23 and S305 in FIG. 19).

Next, control unit 21 performs the above-described operations of S306 to S313 and S314 in Example 2 (S406). When judging that a feedback adjustment is unnecessary, control unit 21 distributes the rest of the contents of the print job among the both image forming apparatuses, according to the throughputs, amounts of consumables and working conditions of these apparatuses (S407).

As described above, in print processing by using plural image forming apparatuses, the plural image forming apparatuses are calibrated on the basis of information about a certain type of print medium recorded in the storage unit in advance. It saves operation time needed for the color calibration and avoids a reduction of the working ratio of the printing system.

The present invention should not be limited to the above embodiments and examples, and their constitution and control can be modified unless the modification deviates from the meaning of the present invention.

For example, the above-described examples gave a description that control unit 21 notifies a judgement result of a feedback-adjustment necessity to an operator by displaying various screens or user interfaces announcing the judgement result on display unit 28. Alternatively, the control unit may use an output unit previously prepared in controller 20 to notify the judgement result of a feedback-adjustment necessity to an operator by using a voice or light.

As another example, the above-described examples gave a description that the database includes information about a judgement of a feedback-adjustment necessity for a type of print medium to be used for color calibration. If the database does not include the information about a judgement of a feedback-adjustment necessity for the type of print medium, the control unit 21 may specify a type of print medium closest to the type of print medium to be used for color calibration among the types of print medium stored in the database, on the basis of the amount of toner to be adhered to each types of print medium, and then use the information about a judgement of a feedback-adjustment necessity, corresponding to the specified type of print medium to judge the feedback-adjustment necessity.

As another example, the above-described examples gave a description that the control unit 21 calculates various color differences by using L*a*b* values. Alternatively, the control unit 21 may use color differences calculated by using color values in an arbitrary color space to judge a feedback-adjustment necessity.

As another example, the above-described examples gave a description that gray-balance calibration is performed as color calibration and a multidimensional color correction LUT is used for the color calibration as a color correction LUT. Alternatively, the above described operations and methods may be applied to color matching for creating a device-link profile as a kind of color calibration, and a device-link profile may be used for the color calibration as a color correction LUT.

The present invention is applicable to a control program that causes a computing device or processor to create a database for judging a feedback-adjustment necessity in color calibration, a control program that causes a computing device or processor to perform a feedback control in the color calibration on the basis of the database, a non-transitory computer-readable storage medium storing any of the control programs, a control device that creates the database, a control device that performs the feedback control in the color calibration on the basis of the database, and a control method to be used in a printing system including any of the control devices.

The invention claimed is:

1. A non-transitory computer-readable storage medium storing a control program for color calibration, the control program comprising instructions which, when executed by a computing device or processor, cause the computing device or processor to perform operations, the computing device or processor being configured to control a printing unit and a color measurement unit and communicably connected with a storage unit, the operations comprising:
   (1) creating an image of a color calibration chart including an array of patches of colors in a color calibration target, and using the printing unit to print the image of the color calibration chart on a print medium as one of a plurality of paper products belonging to a predetermined type of print medium;
   (2) obtaining data of color measurement of the color calibration chart printed on the print medium in (1) from the color measurement unit;
   (3) calculating a white-ground color difference being a color difference between color values of white color in the color calibration target and measured color values of a ground of the print medium;
   (4) creating a color correction LUT which makes measured color values of each patch color of the color calibration chart, obtained by the color measurement in (2) close to color values of a corresponding color in the color calibration target;
   (5) adjusting the color correction LUT by repeating a feedback adjustment of the color correction LUT a predetermined number of times, the feedback adjustment including
      (A) creating an image of a corrected color calibration chart including an array of patches of colors in the color calibration target corrected with the color correction LUT, and using the printing unit to print the image of the corrected color calibration chart on a print medium as the one of the plurality of paper products belonging to the predetermined type of print medium,
      (B) obtaining data of color measurement of the corrected color calibration chart printed on the print medium in (A) from the color measurement unit,
      (C) calculating color differences between measured color values of patch colors of the corrected color calibration chart, obtained by the color measurement in (B) and color values of respective colors in the color calibration target, and obtaining a representative color difference of the color differences, and
      (D) creating a color correction LUT which makes measured color values of each patch color of the corrected color calibration chart, obtained by the color measurement in (B) close to color values of a corresponding color in the color calibration target;
   (6) choosing a smallest value among the representative color differences obtained by a predetermined number of repetitions of the feedback adjustment in (5), as a resulting color accuracy for the one of the plurality of paper products; and
   (7) performing (1) to (6) on at least one print medium as another or others of the plurality of paper products belonging the predetermined type of print medium, to create a database to be used for a judgement of a necessity for a feedback adjustment of a color correction LUT, for the predetermined type of print medium, the creating the database including,
  associating, with the predetermined type of print medium, the white-ground color difference and the resulting color accuracy both obtained for each paper product belonging to the predetermined type of print medium, to obtain a mathematical relation which gives from a certain white-ground color difference a corresponding resulting color accuracy,
  creating the database on a basis of the mathematical relation, and
  storing the database into the storage unit.

2. The non-transitory computer-readable storage medium of claim 1,
  wherein the mathematical relation is an approximate linear equation.

3. The non-transitory computer-readable storage medium of claim 1,
  wherein the operations further comprise, after the creating the database,
    performing a feedback adjustment of the color correction LUT by using the database, the feedback adjustment including
    (a) creating an image of a corrected color calibration chart including an array of patches of colors in the color calibration target corrected with the color correction LUT adjusted in (5), and using the printing unit to print the image of the corrected color calibration chart on a print medium as one of the plurality of paper products belonging to the predetermined type of print medium,
    (b) obtaining data of color measurement of the corrected color calibration chart printed on the print medium in (a) from the color measurement unit,
    (c) calculating color differences between measured color values of patch colors of the corrected color calibration chart, obtained by the color measurement in (b) and color values of respective colors in the color calibration target, and obtaining a representative color difference of the color differences,
    (d) calculating a white-ground color difference being a color difference between color values of white color in the color calibration target and measured color values of a ground of the print medium,
    (e) using a database to obtain an estimate of a resulting color accuracy corresponding to the white-ground color difference calculated in (d), and
    (f) making a judgement of a necessity for a feedback adjustment of the color correction LUT by comparing the representative color difference calculated in (c) with the estimate of the resulting color accuracy obtained in (e), using an output unit, which is controllable by the computing device or processor, to output a result of the judgement, and receiving an operator's instruction whether or not to perform a succeeding feedback adjustment of the color correction LUT.

4. The non-transitory computer-readable storage medium of claim 3,
  wherein the operations further comprise, in response to receiving an operator's instruction to perform a succeeding feedback adjustment of the color correction LUT, in (f),
    creating a color correction LUT which makes measured color values of each patch color of the corrected color calibration chart, obtained by the color measurement in (b) close to color values of a corresponding color in the color calibration target, and
    performing the feedback adjustment of the created color correction LUT, including (a) to (f), by using the database.

5. A non-transitory computer-readable storage medium storing a control program for color calibration, the control program comprising instructions which, when executed by a computing device or processor, cause the computing device or processor to perform operations, the computing device or processor being configured to control a printing unit, a color measurement unit and an output unit and communicably connected with a storage unit, the operations comprising:
  (i) creating an image of a color calibration chart including an array of patches of colors in a color calibration target, and using the printing unit to print the image of the color calibration chart on a print medium as one of a plurality of paper products belonging to a predetermined type of print medium;
  (ii) obtaining data of color measurement of the color calibration chart printed on the print medium in (i) from the color measurement unit;
  (iii) creating a color correction LUT which makes measured color values of each patch color of the color calibration chart, obtained by the color measurement in (ii) close to color values of a corresponding color in the color calibration target; and
  (iv) adjusting the color correction LUT by performing a feedback adjustment of the color correction LUT, the feedback adjustment including
    (a) creating an image of a corrected color calibration chart including an array of patches of colors in the color calibration target corrected with the color correction LUT, and using the printing unit to print the image of the corrected color calibration chart on a print medium as the one of the plurality of paper products belonging to the predetermined type of print medium,
    (b) obtaining data of color measurement of the corrected color calibration chart printed on the print medium in (a) from the color measurement unit,
    (c) calculating color differences between measured color values of patch colors of the corrected color calibration chart, obtained by the color measurement in (b) and color values of respective colors in the color calibration target, and obtaining a representative color difference of the color differences,
    (d) calculating a white-ground color difference being a color difference between color values of white color in the color calibration target and measured color values of a ground of the print medium,
    (e) using a database stored in the storage unit, including data which associates the white-ground color difference and the resulting color difference for each of paper products belonging to the predetermined type of print medium, and obtaining an estimate of a resulting color accuracy corresponding to the white-ground color difference calculated in (d), and
    (f) making a judgement of a necessity for a feedback adjustment of the color correction LUT by comparing the representative color difference calculated in (c) with the estimate of the resulting color accuracy obtained in (e), using the output unit to output a result of the judgement, and receiving an operator's instruction whether or not to perform a succeeding feedback adjustment of the color correction LUT.

6. The non-transitory computer-readable storage medium of claim 5,
wherein the operations further comprise, in response to receiving an operator's instruction to perform a succeeding feedback adjustment of the color correction LUT, in (f),
creating a color correction LUT which makes measured color values of each patch color of the corrected color calibration chart, obtained by the color measurement in (b) close to color values of a corresponding color in the color calibration target, and
performing the feedback adjustment of the created color correction LUT, including (a) to (f), by using the database.

7. The non-transitory computer-readable storage medium of claim 1,
wherein the database is created for each model of devices equipped with a printing unit and/or each of the devices equipped with a printing unit.

8. The non-transitory computer-readable storage medium of claim 1,
wherein the color calibration is gray-balance calibration, and the color correction LUT is a multidimensional color correction LUT.

9. The non-transitory computer-readable storage medium of claim 1,
wherein the color calibration is color matching to be performed for creating a device-link profile, and the color correction LUT is a device-link profile.

10. The non-transitory computer-readable storage medium of claim 1,
wherein the representative color difference is obtained by using the color differences calculated for all patches in the corrected color calibration chart to calculate one of a mean of the color differences, a ninety-five percentile value of the color differences, a largest color difference among the color differences, and a mean of a predetermined number of largest color differences among the color differences.

11. The non-transitory computer-readable storage medium of claim 5,
wherein the database is created for each model of devices equipped with a printing unit and/or each of the devices equipped with a printing unit.

12. The non-transitory computer-readable storage medium of claim 5,
wherein the color calibration is gray-balance calibration, and the color correction LUT is a multidimensional color correction LUT.

13. The non-transitory computer-readable storage medium of claim 5,
wherein the color calibration is color matching to be performed for creating a device-link profile, and the color correction LUT is a device-link profile.

14. The non-transitory computer-readable storage medium of claim 5,
wherein the representative color difference is obtained by using the color differences calculated for all patches in the corrected color calibration chart to calculate one of a mean of the color differences, a ninety-five percentile value of the color differences, a largest color difference among the color differences, and a mean of a predetermined number of largest color differences among the color differences.

15. A control device connected with a printing unit and a color measurement unit, the control device comprising:
a storage unit; and
a processor that performs operations including
(1) creating an image of a color calibration chart including an array of patches of colors in a color calibration target, and using the printing unit to print the image of the color calibration chart on a print medium as one of a plurality of paper products belonging to a predetermined type of print medium;
(2) obtaining data of color measurement of the color calibration chart printed on the print medium in (1) from the color measurement unit;
(3) calculating a white-ground color difference being a color difference between color values of white color in the color calibration target and measured color values of a ground of the print medium;
(4) creating a color correction LUT which makes measured color values of each patch color of the color calibration chart, obtained by the color measurement in (2) close to color values of a corresponding color in the color calibration target;
(5) adjusting the color correction LUT by repeating a feedback adjustment of the color correction LUT a predetermined number of times, the feedback adjustment including
(A) creating an image of a corrected color calibration chart including an array of patches of colors in the color calibration target corrected with the color correction LUT, and using the printing unit to print the image of the corrected color calibration chart on a print medium as the one of the plurality of paper products belonging to the predetermined type of print medium,
(B) obtaining data of color measurement of the corrected color calibration chart printed on the print medium in (A) from the color measurement unit,
(C) calculating color differences between measured color values of patch colors of the corrected color calibration chart, obtained by the color measurement in (B) and color values of respective colors in the color calibration target, and obtaining a representative color difference of the color differences, and
(D) creating a color correction LUT which makes measured color values of each patch color of the corrected color calibration chart, obtained by the color measurement in (B) close to color values of a corresponding color in the color calibration target;
(6) choosing a smallest value among the representative color differences obtained by a predetermined number of repetitions of the feedback adjustment in (5), as a resulting color accuracy for the one of the plurality of paper products; and
(7) performing (1) to (6) on at least one print medium as another or others of the plurality of paper products belonging the predetermined type of print medium, to create a database to be used for a judgement of a necessity for a feedback adjustment of a color correction LUT, for the predetermined type of print medium, the creating the database including,
associating, with the predetermined type of print medium, the white-ground color difference and the resulting color accuracy both obtained for each paper product belonging to the predetermined type of print medium, to obtain a mathematical relation which gives from a certain white-ground color difference a corresponding resulting color accuracy,
creating the database on a basis of the mathematical relation, and
storing the database into the storage unit.

16. The control device of claim 15,
wherein the mathematical relation is an approximate linear equation.

17. The control device of claim 15, further comprising an output unit,
wherein the operations further include, after the creating the database,
performing a feedback adjustment of the color correction LUT by using the database, the feedback adjustment including
(a) creating an image of a corrected color calibration chart including an array of patches of colors in the color calibration target corrected with the color correction LUT adjusted in (5), and using the printing unit to print the image of the corrected color calibration chart on a print medium as one of the plurality of paper products belonging to the predetermined type of print medium,
(b) obtaining data of color measurement of the corrected color calibration chart printed on the print medium in (a) from the color measurement unit,
(c) calculating color differences between measured color values of patch colors of the corrected color calibration chart, obtained by the color measurement in (b) and color values of respective colors in the color calibration target, and obtaining a representative color difference of the color differences,
(d) calculating a white-ground color difference being a color difference between color values of white color in the color calibration target and measured color values of a ground of the print medium,
(e) using a database to obtain an estimate of a resulting color accuracy corresponding to the white-ground color difference calculated in (d), and
(f) making a judgement of a necessity for a feedback adjustment of the color correction LUT by comparing the representative color difference calculated in (c) with the estimate of the resulting color accuracy obtained in (e), using the output unit to output a result of the judgement, and receiving an operator's instruction whether or not to perform a succeeding feedback adjustment of the color correction LUT.

18. A control device connected with a printing unit and a color measurement unit, the control device comprising:
a storage unit;
an output unit; and
a processor that performs operations including
(i) creating an image of a color calibration chart including an array of patches of colors in a color calibration target, and using the printing unit to print the image of the color calibration chart on a print medium as one of a plurality of paper products belonging to a predetermined type of print medium;
(ii) obtaining data of color measurement of the color calibration chart printed on the print medium in (i) from the color measurement unit;
(iii) creating a color correction LUT which makes measured color values of each patch color of the color calibration chart, obtained by the color measurement in (ii) close to color values of a corresponding color in the color calibration target; and
(iv) adjusting the color correction LUT by performing a feedback adjustment of the color correction LUT, the feedback adjustment including
(a) creating an image of a corrected color calibration chart including an array of patches of colors in the color calibration target corrected with the color correction LUT, and using the printing unit to print the image of the corrected color calibration chart on a print medium as the one of the plurality of paper products belonging to the predetermined type of print medium,
(b) obtaining data of color measurement of the corrected color calibration chart printed on the print medium in (a) from the color measurement unit,
(c) calculating color differences between measured color values of patch colors of the corrected color calibration chart, obtained by the color measurement in (b) and color values of respective colors in the color calibration target, and obtaining a representative color difference of the color differences,
(d) calculating a white-ground color difference being a color difference between color values of white color in the color calibration target and measured color values of a ground of the print medium,
(e) using a database stored in the storage unit, including data which associates the white-ground color difference and the resulting color difference for each of paper products belonging to the predetermined type of print medium, and obtaining an estimate of a resulting color accuracy corresponding to the white-ground color difference calculated in (d), and
(f) making a judgement of a necessity for a feedback adjustment of the color correction LUT by comparing the representative color difference calculated in (c) with the estimate of the resulting color accuracy obtained in (e), using the output unit to output a result of the judgement, and receiving an operator's instruction whether or not to perform a succeeding feedback adjustment of the color correction LUT.

19. The control device of claim 18,
wherein the operations further include, in response to receiving an operator's instruction to perform a succeeding feedback adjustment of the color correction LUT, in (f),
creating a color correction LUT which makes measured color values of each patch color of the corrected color calibration chart, obtained by the color measurement in (b) close to color values of a corresponding color in the color calibration target, and
performing the feedback adjustment of the created color correction LUT, including (a) to (f), by using the database.

20. The control device of claim 15,
wherein the database is created for each model of devices equipped with a printing unit and/or each of the devices equipped with a printing unit.

21. The control device of claim 15,
wherein the color calibration is gray-balance calibration, and the color correction LUT is a multidimensional color correction LUT.

22. The control device of claim 15,
wherein the color calibration is color matching to be performed for creating a device-link profile, and the color correction LUT is a device-link profile.

23. The control device of claim 15,
wherein the representative color difference is obtained by using the color differences calculated for all patches in the corrected color calibration chart to calculate one of a mean of the color differences, a ninety-five percentile value of the color differences, a largest color difference among the color differences, and a mean of a predetermined number of largest color differences among the color differences.

24. The control device of claim 18,
wherein the database is created for each model of devices equipped with a printing unit and/or each of the devices equipped with a printing unit.

25. The control device of claim 18,
wherein the color calibration is gray-balance calibration, and the color correction LUT is a multidimensional color correction LUT.

26. The control device of claim 18,
wherein the color calibration is color matching to be performed for creating a device-link profile, and the color correction LUT is a device-link profile.

27. The control device of claim 18,
wherein the representative color difference is obtained by using the color differences calculated for all patches in the corrected color calibration chart to calculate one of a mean of the color differences, a ninety-five percentile value of the color differences, a largest color difference among the color differences, and a mean of a predetermined number of largest color differences among the color differences.

* * * * *